United States Patent [19]

Paradies et al.

[11] Patent Number: 5,119,318
[45] Date of Patent: Jun. 2, 1992

[54] EXPERT CONTROL SYSTEM FOR REAL TIME MANAGEMENT OF AUTOMATED FACTORY EQUIPMENT

[75] Inventors: David Paradies, Los Osos; Edison Tse, Los Altos; Gary M. Leo, Fairfax, all of Calif.

[73] Assignee: DEL Partners L.P., Palo Alto, Calif.

[21] Appl. No.: 339,535

[22] Filed: Apr. 17, 1989

[51] Int. Cl.⁵ .............................................. G06F 15/18
[52] U.S. Cl. ...................... 395/61; 364/468; 395/52; 395/904
[58] Field of Search ............................... 364/513, 468

[56] References Cited

U.S. PATENT DOCUMENTS

| | | | |
|---|---|---|---|
| 4,064,394 | 12/1977 | Allen | 364/200 |
| 4,270,184 | 5/1981 | Shimokawa | 364/900 |
| 4,365,279 | 12/1982 | Gishman, Jr. | 364/200 |
| 4,512,747 | 4/1985 | Hitchens et al. | 364/578 |
| 4,591,983 | 5/1986 | Bennett et al. | 364/478 |
| 4,642,782 | 2/1987 | Kemper et al. | 364/550 |
| 4,644,479 | 2/1987 | Kemper et al. | 364/513 |
| 4,649,515 | 3/1987 | Thompson et al. | 364/513 |
| 4,675,829 | 6/1987 | Clemenson | 364/513 |
| 4,687,946 | 8/1987 | Jones | 364/200 |
| 4,698,756 | 10/1987 | Gonzalez et al. | 364/513 |
| 4,704,695 | 11/1987 | Kimura et al. | 364/513 |
| 4,779,208 | 10/1988 | Tsuruta et al. | 364/513 |
| 4,783,752 | 11/1988 | Kaplan et al. | 364/513 |
| 4,803,642 | 2/1988 | Muranaga | 364/513 |
| 4,860,213 | 8/1989 | Bonissone | 364/513 |
| 4,860,214 | 8/1989 | Matsuda et al. | 364/513 |
| 4,970,657 | 11/1990 | Wolf | 364/513 |

OTHER PUBLICATIONS

The Knowledge-Based Expert System: A Tutorial; F. Hayes-Roth; Computer; Sep. 1984; pp. 11-28.

*Primary Examiner*—Allen R. MacDonald
*Attorney, Agent, or Firm*—Skjerven, Morrill, MacPherson, Franklin & Friel

[57] ABSTRACT

An expert control system for the real time management of an automated factor is disclosed. Variables within rule base trees of the expert control system are preferably restricted to taking on only four values, namely, true (T), false (F), indeterminate (I), and untested (U). Flexibility for responding to real time changes in the automated factory is provided by a command structure which allows the value of any arbitrary variable within a rule base tree to be changed from its current value to any one of the other three values.

1 Claim, 11 Drawing Sheets

A=B & C

| A\B<br>C | T | F | U | I |
|---|---|---|---|---|
| T | T | F | U | I |
| F | F | F | F | F |
| U | U | F | U | I |
| I | I | F | I | I |

| A\B<br>C | T | F | U | I |
|---|---|---|---|---|
| T | T | T | T | T |
| F | T | F | U | I |
| U | T | U | U | U |
| I | T | I | U | I |

| A\B<br>C | T | F | U | I |
|---|---|---|---|---|
| T | F | T | U | I |
| F | F | T | U | I |
| U | F | T | U | I |
| I | F | T | U | I |

| A\B<br>C | T | F | U | I |
|---|---|---|---|---|
| T | x | F | x | x |
| F | F | U | U | U |
| U | x | U | U | U |
| I | x | U | U | U | x = NOT POSSIBLE

FIG. 3D

EXPERT CONTROL SYSTEM FOR REAL TIME MANAGEMENT OF AUTOMATED FACTORY EQUIPMENT

INCORPORATION OF MICROFICHE APPENDIX

This application includes a computer program listing in the form of Microfiche Appendix A which listing is being filed concurrently herewith as 85 frames (plus a target frame) incorporated in one sheet of microfiche in accordance with 37 C.F.R. §1.96. The disclosed computer program, MOBIUS TM, (including the C language source code thereof and any object code which may be derived therefrom), is subject to copyright protection. The copyright owner has no objection to the facsimile reproduction by anyone of the patent document (or the patent disclosure as it appears in the files or records of the U.S. Patent and Trademark Office) for the purpose of studying and understanding the invention but otherwise reserves all other rights to the disclosed computer program including the right to reproduce said computer program in machine-executable form for the purpose of commercial exploitation.

BACKGROUND OF THE INVENTION

1. Field of the Invention

This invention relates generally to so-called "artificial intelligence" (AI) systems, "expert systems" or "knowledge-based systems". The invention is more specifically related to the development and application of an expert knowledge base for use in the real time management of an automated factory.

2. Description of the Prior Art

So-called "expert systems" are often formed of computer hardware/software combinations which are structured to mimic the behavior of a human having expert knowledge in a particular field. The human expert provides guidelines for reasoning through problems within the expert's field and these guidelines are transformed into a set of "if-then" rule constructs. The latter constructs may be expressed in software and/or hardware but are most typically expressed in software using an AI language such as LISP or PROLOG. A compilation of if-then constructs forms a so called "knowledge base" or "rule base". The knowledge base (rule-base) is normally programmed into the memory of a suitable computer in the form of a LISP or PROLOG compatible "data base" in order to provide the computer with welldefined symbol processing rules for deriving by means of "inferencing", answers to real-world questions. Inferenced answers are derived on the basis of both the transformed guideline-knowledge of the human expert and on "facts" that are established (inferred) from sensing the real world. For a generalized explanation of artificial intelligence, the reader is directed to references such as "Introduction to Artificial Intelligence", Eugene Charniah and Drew McDermott, Addison Wesley Publishing Company, 1985 and "Building Expert Systems", F. Hayes-Roth, D. A. Waterman and D. B. Lenat, Editors, Addision-Wesley Publishing Company, 1983.

Examples of systems employing expert-system technology are disclosed in: (a) U.S. Pat. No. 4,783,752, "Knowledge Based Processor for Application Programs Using Conventional DataProcessing Capabilities" issued Nov. 8, 1988 to Kaplan et al.; (b) U.S. Pat. No. 4,779,208, "Information Processing System and Method for Use In Computer Systems Suitable for Production System" issued Oct. 18, 1988 to Tsuruta et al.; (c) U.S. Pat. No. 4,704,695, "Inference System" issued Nov. 3, 1987 to Kimura et al.; (d) U.S. Pat. No. 4,675,829, "Method and Apparatus for Building Knowledge-Based Systems" issued Jun. 23, 1987 to Clemenson; (e) U.S. Pat. No. 4,642,782, "Rule Based Diagnostic System With Dynamic Alteration Capability" issued Feb. 10, 1987 to Kemper et al.; and (f) U.S. Pat. No. 4,591,983, "Hierarchical Knowledge System" issued May 27, 1986 to Bennett et al. The disclosures of these patents (a–f) are incorporated herein by reference.

Expert-system technology can be employed in an unlimited number of applications. By way of example, the technology can be applied for creating an intelligent gameplaying machine which mimics the behavior of an expert gameplayer such as a chess master, for creating an automated instruction machine which mimics the instructional behavior of a college professor or for creating a medical diagnosis machine which mimics the behavior of a trained medical specialist (i.e., the EMYCIN system developed at Stanford University, California).

In many such applications, the expert system is not expected to perform the operations of analyzing received information and arriving at expert conclusions any faster than its human counterpart. In some instances, the expert system is permitted to take substantially more time to arrive at conclusions than its human counterpart. There are few, if any, time-imposed constraints created in these cases on the strategies that may be adopted for artificially imitating human intelligence. As a result, the information processing speed of an underlying (supporting) computer is not a crucial factor and neither is the real-time speed of the computer algorithm which provides the computer with its artificial intelligence (AI). Relatively generic types of symbol manipulation algorithms can be freely developed to solve problems for such cases. Examples of general-purpose expert "shells" include the Nexpert TM software package of Neuron Data Inc. and the Sl TM and Ml TM software packages available from Tecknowledge Inc.

There is a class of situations where time and speed are important; where it is desirable to have the ability to analyze large volumes of data and arrive quickly at expert-type conclusions at speeds substantially faster than a human expert. The real time management of a high speed factory production line, where the latter is to be automated to process a large volume of work-product through a large number of simultaneously-operating workstations, is one example of this class of situations.

It has been proposed that expert-system technology should be applied to the real time management of automated factories such as factories which employ robots (intelligent production machines) for the assembly of products.

Modern factories are often arranged to have a large number of automated workstations (i.e., 10, 100 or more different pieces of robotic production equipment) disposed in array fashion on a production floor. Typically, each workstation is configured for a highly specialized task (i.e., welding, drilling, sewing, etc.) and its operation is controlled by a specially and individually programmed computer control system. The latter computer control system of each specialized workstation is often referred to in the trade as a "programmable logic controller" or more simply, a PLC. Examples of PLC's are disclosed in U.S. Pat. No. 4,365,297, "Industrial Control System With Distributed Computer Implemented Logic", issued Dec. 21, 1982, to Grisham Jr. et al. and in U.S. Pat. No. 4,270,184, "Microprocessor-Based Programmable Logic Controller" issued May 26, 1981, to Shimokawa et al. The disclosures of these patents are incorporated herein by reference. PLC's are commercially available from companies such as Allen-Bradely Inc. of Cleveland, Ohio and Modicon Inc. of North Andover, Massachusetts under the respective tradenames of A-B PLC-2/30 Processor TM and Micro-84 TM.

The development of an automated management system for managing a large sized array of PLC controlled equipment can pose a complex challenge. By way of example, let it be assumed that a factory production line comprises a large number (i.e., ten or more) of differently configured workstations including automated drilling machines, welding machines, component insertion machines, polishing machines, painting machines and so forth. Let it further be assumed that workpieces can be programmably routed from one station to another as desired to provide a wide variety of machining sequences. (An automated routing system having the ability to route objects through a complex conveyance maze is disclosed in U.S. Pat. No. 4,512,747 issued Apr. 23, 1985 to Hitchens, which disclosure is incorporated herein by reference.)

Let it be presumed that if one of the workstations malfunctions or needs to be shut down, it will often be possible to maintain flow on the production line by changing the machining sequence of the line so as to temporarily circumvent the malfunctioning workstation and to complete the manufacturing process by later returning workpieces to the circumvented workstation after the malfunction is corrected. But also let it be assumed that there will be complications to such circumvention. For the sake of example, let it be supposed that if the malfunctioning workstation cannot be fixed within a given period of time, it is preferable to shut down the entire production line rather than to allow a large inventory of unfinished parts (for which storage space is not available) to accumulate around the malfunctioning workstation.

Given this scenario, let it be further assumed that the PLC's of all workstations on the production line are coupled via a local area network (LAN) to a computerized central management system and that the latter system is expected to intelligently manage the production floor and cope with emergent problems in the same manner as would an intelligent human manager (expert), but at much higher speeds.

Under such a postulated situation, the following problem can be posed. What operations should the central management system perform if it unexpectedly receives a message from the PLC (programmable logic controller) of a component inserting machine, X, indicating that the inserting machine X has run out of stock? It could be that the out-of-stock message is in error (i.e., due to a faulty sensor in machine X) and that no action needs to be taken. On the other hand, if the message is correct, a determination has to be made immediately whether to shut down the entire production line so as to prevent accumulation of excessive numbers of incomplete workpieces around the out-of-stock machine or whether to temporarily bypass the out-of-stock machine X and to reroute workpieces to other workstations. If the latter course of action is chosen, the management system should issue a request to an inventory system for additional machine-X stock and find out how much time it will take to receive the machine X stock so that it can calculate/control the amount of unfinished inventory that will be allowed to build up around the out-of-stock machine X. The decision calls for expert analysis and judgment.

The decision making responsibilities of the system do not stop at this first question but rather grow more complex as one realizes that the management system might be expected to further consider, as would a human manager, the question of whether the issued request for additional stock has been received by the inventory system and whether the inventory system is responding appropriately (expeditiously) to that request. A large maze of other questions can grow from the first set of posed questions as further aspects of the management operation are considered.

It can be appreciated that a fairly sophisticated management system might be needed to handle all the complications which could evolve on a factory line and that expert-system technology could be advantageously applied to design such a sophisticated management system.

Previously devised expert systems have been unable to fully meet the challenge of real time factory management. The general-purpose architectures of commercially available expert-systems (i.e., so-called expert "shells") are designed to generically process all types of symbolic relationships and this generalism often makes them too slow to be able to respond in timely fashion to real time developments on a factory floor.

An application-specific expert control system for the real time management of automated factory production lines and a method for developing the same have been proposed by the Ultimate Media Enterprises Corporation of Larkspur, California (hereafter "UME"). The UME system/method is based on a four-state reasoning paradigm wherein the "value" of postulated variables such as "insertion-machine-x-has-run-out-of-stock" or "the-PLC-of-insertion-machine-x-is-malfunctioning" are restricted to being either true (T), false (F), untested (U) or indeterminate even though tested (I).

Relational formulations (if-then constructs) having a form such as: —"machine-X-is-out-of-stock" is true (T) IF "the-PLC-of-machine-X-is-malfunctioning" is false (F) AND "out-of-stock-message-received-from-machine-X" is true (T)—are accumulated in a computer memory, according to the UME method, to create a rule base tree.

A rule base tree can be diagrammed to have the form of a natural tree, including roots, branches and nodes at which one branch joins with another. The values of unique variables are each located at a specific node. Variables whose values are not logical functions of other variables in the tree, but rather direct functions of PLC provided messages, can be visualized as defining bottom roots of the rule base tree. Variables whose states are indirectly determined by the values at the roots but whose states do not affect further (higher) variables in the tree can be visualized as defining branch tips of the tree. The logical operators which link the roots directly or indirectly to the branch tips can be visualized as defining branches and subbranches.

In the UME system, an "inferencing engine" works its way downwardly through a maze of branches and sub-branches in the rule base tree, from a variable (branch node) whose factual status is unknown but needs to be resolved (a so-called "hypothesis" or "goal" variable), toward the roots in order to find a path which will enable the engine to resolve the value of that unknown variable. In working its way down the tree, the inferencing engine identifies other unknown variables of the tree upon which the value of the "hypothesis" is predicated and designates these other variables as subgoals. The value of a hypothesis variable at the top of the tree is derived by finding at least one path linking predicate tree roots which have known T or F values to the hypothesis, and performing prespecified logical function operations on these predicate roots to thereby establish the T or F values of other variables higher up on the one path. The T or F establishing process continues up the linking path in the tree until the factual status (T or F) of the goal and its predicate subgoals is resolved.

Lower tree variables can be diagrammed as being coupled to higher tree variables by the tree branches and the tree branch couplings between the variables can be viewed as defining the various logical operations such as AND, OR and NOT which are to be performed in order to establish the value of a higher variable on the basis of lower variables.

It can be appreciated that once the values of the roots in a rule base tree are established, the effects of their states can be propagated upwardly through the tree along a continuous path linking the roots to the branch tips by performing the branch-defined logical operations (AND, OR, NOT) of the path that couple unresolved variables to preresolved predicate variables below them. According to the UME approach, this upward propagation of branch-defined operations is limited to occurring only once--in order to maximize the speed at which the expert system traverses through the maze of paths in a tree and reaches a conclusion. A variable can never be considered untested (U) according to the UME algorithm after an attempt is made to evaluate it. This will be explained more fully later on.

In accordance with the UME method, a rule base tree is formed by compiling branches (AND/OR/NOT, mutual-exclusive formulations) and linking them to one another. There is a fixed limitation on the number of logical variables (256) which the UME system can handle and also on the number (15) of antecedent variables and/or logical operators which may be listed in the righthand side of each AND/OR formulation (i.e., A=B&C!D&E!F&G. . .). The branches and subbranches of a rule base tree are defined and linked by a knowledge-building team comprised of at least one human expert and one human computer programmer. The human programmer is expected to possess expert knowledge about the computer language and algorithms that are used to implement both the rule base and the inferencing engine while the human expert is expected to possess expertise about the factory production line that is to be managed and preferred ways of managing the line. The members of the team are supposed to work together in a highly cooperative manner to combine their individual areas of expertise, and from such combination, build a computer-usable data base which will define an error-free intelligence-providing rule base for a predefined "inferencing engine". One reason that a human programmer is usually required on the knowledge-building team is because the UME rule-base constructing language consists of numerically coded commands rather than English-like instructions which could be readily understood by persons who have not memorized a long list of numeric command codes.

When the team-constructed rule base is completed, it is coupled to the predefined inferencing-engine and the inferencing-engine is activated to begin evaluating the states (T,F,U,I) of preselected variables (hypotheses) within the rule base tree in accordance with "facts" that are inferred from data supplied by external sensors. The inferred states (T, F, U or I) of "goal" variables near the top of the rule base tree are ultimately supplied to if-then "command" constructs. The command constructs determine what course of action or nonaction the expert control system will choose to follow in response to perceived conditions on the factory floor.

While the expert control arrangement described above should work nicely from the purely theoretical point of view, the problems of real-world factory environments have to be considered in more detail.

One problem which is often overlooked, but needs consideration, is how to establish a reasonable balance between the cost of an expert control system (hereafter also referred to as an "ECS") and the speed at which the expert control system performs its decision-making operations. If the cost of the expert control system is unreasonably high because a very expensive "super computer" (i.e., a Cray machine) is needed for quickly executing certain AI operations, or because a large amount of development work is needed to generate the AI functions, it may be economically preferable to use one or more human experts to manage the production floor instead of the very expensive expert system. On the other hand, if the cost of the ECS is kept relatively low, but the decision-making speed and intelligence of the ECS suffer because low speed hardware was employed to reduce price, it may be that the expert control system will not be able to make decisions quickly enough to keep pace with real time developments on the factory production line, and as a result, the ECS will be worthless.

In order to achieve an acceptable balance in the price/performance ratio, the UME expert system was constructed with the above-described four level reasoning paradigm (T,F,U,I) and was further constructed to execute the inferencing operation on a low-priced computer based on the MOS Tech. 6502 microprocessor clocked at 3 MHz.

The UME inferencing engine was restricted to evaluating variables as few times as possible in order to optimize its price/performance ratio. This was achieved by holding constant the true or false (T or F) state of a variable once the value of the variable had risen from a previous (lower) "nonfactual" status of being either untested (U) or indeterminate (I) to a (higher) "factual" status of being conclusively either T or F (fact establishment). It was further achieved by preventing variables from being considered untested (U) after the inferencing engine scans by them once and attempts to establish their factual value. Once-scanned variables are forced to a value of at least indeterminate (I) if not (T) or (F). By omitting further evaluation of variables whose "factual state" (T or F) has already been conclusively established, and identifying all once-scanned variables as indeterminate (I), it was thought that the speed of downward path-finding and upward inferencing could be enhanced and that a commercially feasible price/performance ratio could be achieved.

It turns out that such a speed-enhancing strategy is not in keeping with some of the "real world" conditions which can suddenly develop on a factory production line.

By way of example, if the PLC of a particular workstation X (in an array of hundreds of workstations) begins to suddenly malfunction after the expert control system has already tested that PLC and has already established it to be a conclusive "fact" that the PLC is functioning properly, all inferencing decisions based on the constant state (T) of a variable "PLC-of-machine-X-is-properly-functioning" will be incorrect. (A sudden change of condition could occur for example, by virtue of a human operator manually switching control buttons on the particular machine X, or by virtue of a power supply fuse blowing due to a random power surge.)

By way of further example, if a PLC malfunctions and the ECS correctly sets a status variable "PLC-of-machine-X-is-properly-functioning" to false (F), but then corrective action is taken to bring that PLC back into operation, it is very difficult to reorient the ECS so it realizes the PLC is now functioning properly, because once set to a factual status of false (F), there is no simple mechanism other than a full restart for switching the status variable to the untested (U) value so as to invoke retesting of the now erroneous conclusion (that it is false (F)).

Because the basic strategy of the UME approach cannot accept such contingencies, it has been found that UME-type ECS's tend to lose track of what is actually occurring on the factory floor, and that the actions taken by expert control systems of this type are other than those desired. There remains a need, at least within the automated factory industry, for an expert control system which can be constructed to provide a reasonable balance between price/performance, and which at the same time can deal with the fast-changing "facts" of real world situations.

Another problem found to arise under the UME approach is that at least one human expert and one human computer programmer are required to interact as a tightly-knit team for generating the rule base tree. If the team is to operate efficiently, the human expert must know how to expeditiously communicate abstract rule concepts to the computer programmer and the computer programmer must be able to quickly learn the abstract concepts and then accurately translate such concepts into a machine-understandable data base. In cases where the inferencing engine is unable to perform some of the things desired by the human expert, because of inherent machine limitations or language constraints, the programmer has to be able to recognize this inability and convince the expert that such is the situation. The expert then has to modify his or her thinking patterns to match the capabilities of the machine and communicate a new set of abstract concepts to the programmer.

This knowledge building process can be both time consuming and expensive; especially so in cases where more than two highly skilled individuals might be needed for each step of the knowledge-building process. If there is a break anywhere in the chain of expert-to-programmer-to-machine communication, it is likely that a flaw (bug) will appear in the resultant rule-base tree (data base) and that the resultant expert control system will make incorrect choices. Dependency on this kind of long chained communication is undesirable.

There is yet a further problem with the way that a rule-base tree is developed by the UME method. Under the UME approach, the only way to determine whether a teamcreated rule base is correct (i.e., to determine that it doesn't include "bugs"), is to load an operative expert control system with such a rule base, connect the expert control system directly to the factory management network, and observe the results in real time on the production floor. If errors exist in the rule base, significant damage can occur on the production line. Also, substantial production time may be lost if lengthy real-time debugging is required. A need exists for a method of developing and testing a rule base without applying the same directly to a real time production line and without having to rely on continuous communication between a human expert and a human computer programmer.

SUMMARY OF THE INVENTION

It is an object of the present invention to overcome the above-recited drawbacks of previous expert control systems. It is a further object to provide a reasonable price/performance ratio for a real time factory management system.

In accordance with one aspect of the invention, propositional variables are assigned one of at least four states, true (T), false (F), untested (U) and indeterminate (I) by an inferencing engine, but the states of the propositional variables can be changed, at any time during inferencing, from any one state to any of the other at least three states, including from true or false states to indeterminate or untested states (from a preestablished "factual" status to a "nonfactual" status). The effects of a state change at one point on a rule-base tree are propagated both downwardly and upwardly along the rule base tree. This ability to arbitrarily change variable states and propagate effects both upwardly and downwardly along a rule base tree, even after some variables have attained "factual" values, is referred to herein as "nonmonotonic reasoning".

In accordance with a second aspect of the invention, one or more "actions" may be triggered by one or more of the T,F,U,I states of one or more variables when such states are entered. The assigned actions of each variable are executed when the variable is evaluated and found to have a state whose value and timing matches a triggering condition. Preferably, the actions that may be triggered by the state of a variable include the ability to arbitrarily change the value of any randomly-selected variable from one level to any other, at any time during the evaluation process and/or to immediately exit a first rule base tree (even though some variables remain unresolved in the first tree) and jump to a second rule base tree upon the triggering of a prespecified condition. This allows the inferencing engine to quickly exit a time consuming line of reasoning (inferencing) and adopt a new line of reasoning when emergent conditions develop.

In accordance with a third aspect of the invention, the inferencing operation of an inferencing engine is activated both by looping through a list of prepostulated test variables (hereafter also referred to as "hypothesis list driven inferencing") and/or by the sensing of condition changes among a prespecified set of variables, the latter set including variables whose states are determined by polling (monitoring) real world sensing equipment (hereafter also referred to as "event driven inferencing").

In accordance with yet another aspect of the invention, a prespecified action within an inferencing loop can be made to occur only for certain times, such as only when the inferencing loop is initiated, rather than for all times that the inferencing engine cycles through the inferencing loop. This allows actions to be activated on the basis of both variable value and timing.

In accordance with a further aspect of the invention, a dynamically expandable matrix having plural rows and columns, in which the names of variables are stored, is used for defining the AND/OR structure of a rule-base tree during run time (i.e., during real-time inferencing). At least one column of the matrix is reserved for variable names appearing at the left side of logical formulations (i.e., AND/OR equations of the form A=(B&C)!(D&E&F)!. . .) so as to uniquely identify those formulations by their left-side content (i.e., "A="). A first logical operation, such as the AND operation ("&"), is implied to occur between variables (i.e., B and C) whose names appear in other (right-side) columns of a given row within the matrix. A second logical operation, such as the OR operation ("!"), is implied to occur between the product-string results of matrix rows (i.e., ABC and ADEF) having a common variable name (i.e., "A") in one or more left-side identifying column or columns of the rows. The order in which logical operations are to be carried is implied by the top-to-bottom and/or left-to-right location of variable names within the matrix. Because the type of logical operation to be performed (i.e., AND or OR) and the sequence in which these logical operations are to be performed (which one before the other) are implied by the structure of the matrix rather than expressly indicated by operation identifying characters such as "!" and "&" or operation ordering limiters such as brackets, "(" and ")", the steps of scanning through such operation identifying/ordering characters during real-time inferencing, and executing a unique subroutine for each identifying/ordering character may be obviated. Accordingly, by omitting express indication of the operations to be performed, and instead performing logical operations in accordance with the placement and ordering of variable names within a matrix structure whose rows, columns and sequencing of cells imply logical operations and ordering; the speed of real-time inferencing can be maximized.

In a preferred embodiment of the invention, sentence-like commands having a verb portion (indicating an action) and a subject portion (indicating the recipient of the action) such as, for example, "rungoal" or "setfact", may be used by a human expert to instruct a computerized expert system on the actions to be taken for different circumstances. The sentence-like structure of the command words simplifies the process of learning how to use an expert system in accordance with the invention and often obviates the need for a separate human programmer during the knowledge-building phase of expert system development.

In accordance with yet another aspect of the invention, a software (and/or hardware) modeled version of a to-be-controlled production line is coupled to a software (and/or hardware) model of the expert system (or a test run "twin" of the ECS) and the combination is tested off-line (disconnected from a "real" factory production line) to determine what effects a new rule base will have on the operation of the modeled production line.

This direct coupling of a test-run expert control system to a production line model allows a human expert to learn "off-line" how to create a rule base without the assistance of a human programmer. The human expert can learn simply by observing interactively the effects of rule changes on the modeled production line and developing a "feel" for how changes to the rule base alter the reasoning operation of the expert system. The expert does not have to rely on a human programmer to determine what is or is not feasible. Communication takes place directly between the human expert and the expert control system (test-run version) rather than indirectly through a programmer. There is no danger of damaging a real production line due to a mistake and there is no time pressure arising from an economic desire to bring the real production line back "on-line" as occurs when the latter is temporarily shut down in order to modify a previously created knowledge base or substitute a completely new knowledge base.

Preferably, an automatic "trace" function is included in the test-run (development) version of the ECS to allow the human expert to follow the reasoning chain employed by the computerized expert system as the latter works its way through a rule base tree. Off-line modeling of the factory production line allows on-line control of the "real" production line to continue under a predeveloped rule base so that production flow can be maintained while a new or modified rule base is being concomitantly developed and debugged against a model of the production line. Preferably, the ECS which is managing the real production line includes security means for preventing unauthorized modification of its knowledge base.

In accordance with yet a further aspect of the invention, a source-of-information identifier (link) is associated with one or more propositional variables within a knowledge base tree in order to identify a PLC contact point or global-variable (source-of-information) from which the state of the propositional variable was derived or is to be derived. This feature is very useful during debugging when it is not clear from the formulations of a first rule base tree what external contact point or variable in a second, third, etc., external rule base tree is supposed to supply a desired piece of state information. If the desired information is supposed to be obtained from the programmable logic controller (PLC) of a particular workstation X, but the PLC of that workstation is malfunctioning or the connection to the PLC is incorrect, the source identifier can be used in combination with preestablished knowledge about the functions of the source PLC and/or about the nature of connections which are supposed to be made to that PLC, to generate an action which either circumvents a request for information from the malfunctioning PLC or flags such a request as creating an error condition. The same strategy can be followed when the sought-after information is to be derived from a named source-variable assumed to be within a second, third or other external rule base tree and the second, third or other tree does not include the named source-variable in its variables dictionary.

The above recited aspects are but a synopsis of the present invention. The invention as a whole will be more fully understood when discussed below in detail.

BRIEF DESCRIPTION OF THE DRAWINGS

FIGS. 3A-3D are truth tables respectively showing preferred AND, OR, NOT, and MES relationships between the four-state variables of the invention.

DETAILED DESCRIPTION OF THE PREFERRED EMBODIMENTS

The following is a detailed description of the best modes presently contemplated for practicing the invention. It should be understood that this detailed description is intended to be merely illustrative and that it should not be taken in a limiting sense.

Figure 1:
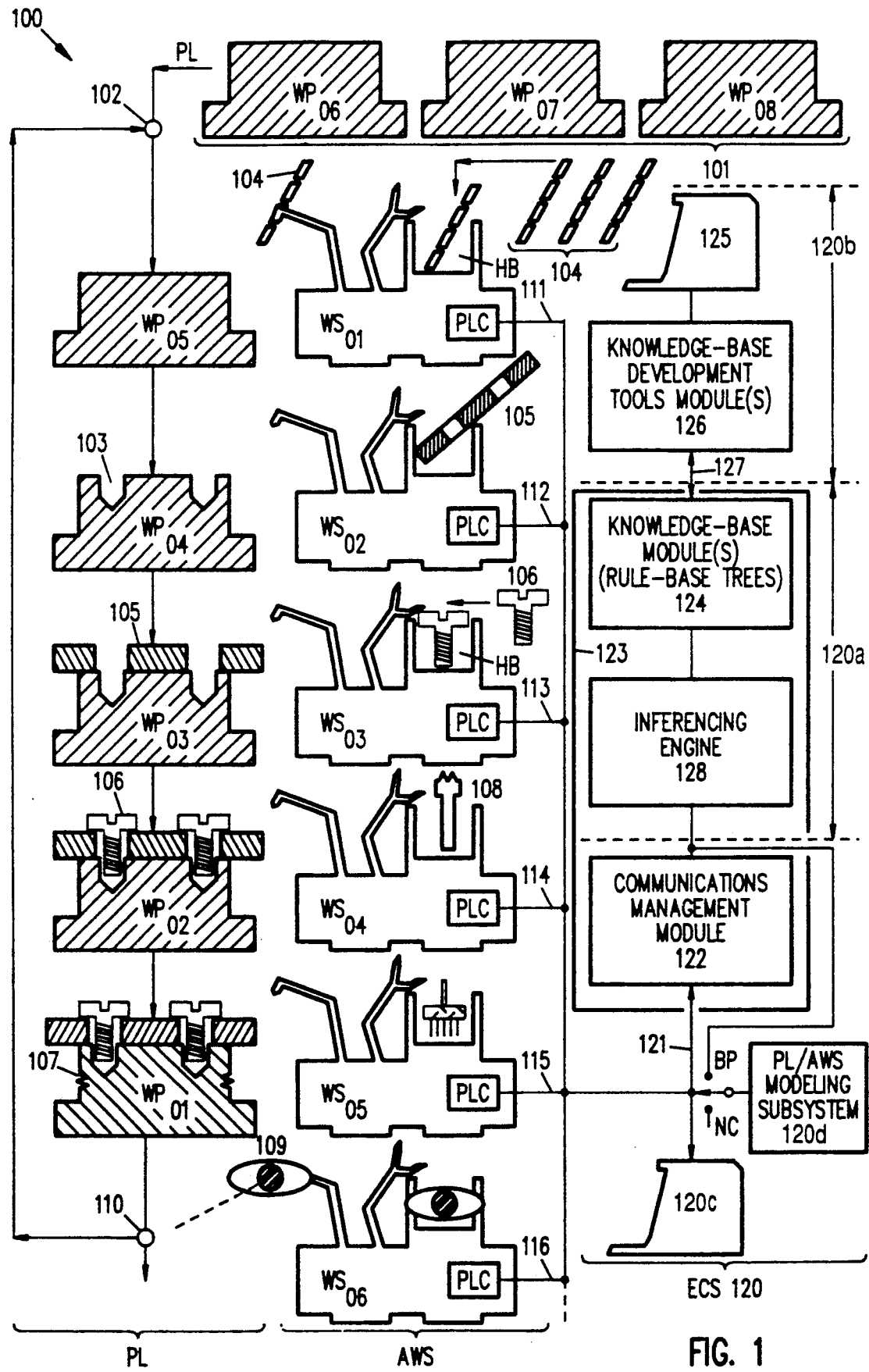
FIG. 1 is a block diagram of an automated factory that is controlled by an expert control system in accordance with the invention.

Referring to FIG. 1, an example of an automated factory system 100 in accordance with the invention is schematically illustrated. In the system 100, an array AWS of workstations, $WS_{01}$-$WS_{06}$, is provided alongside a production line PL. The production line PL routes workpieces, i.e., $WP_{01}$-$WP_{08}$, from one workstation $WS_{xx}$ to the next $WS_{xx+i}$ (xx and i being predetermined integers) to thereby define a sequence of machining operations. Each workstation $WS_{xx}$ can perform a different machining operation. The combination of the workpiece routing system PL and the workstation array AWS will be referred to here as the factory line PL/AWS.

It should be understood here that although the illustrated production line PL is shown to be of a substantially linear structure, production lines which can route workpieces in nonlinear fashion from any one workstation to any randomly selected second workstation are well within the contemplation of this disclosure. Further, it should be understood that although the workstations $WS_{01}$-$WS_{06}$ are schematically illustrated as having identical structures, two or more of these workstations can be of substantially different structures, function in substantially different ways, and can include programmable logic controllers (PLC's) each of which is configured both hardware-wise and softwarewise to control the operation of its corresponding workstation $WS_{xx}$ in a unique manner.

For the sake of illustration, let it be assumed that raw work material 101 (i.e., workpieces $WP_{06}$-$WP_{08}$) enters the production line PL at an entrance node 102. A first workstation, $WS_{01}$, drills plural holes 103 into each workpiece passing through (as shown to have been already done to the first through fourth pieces $WP_{01}$-$WP_{04}$). During the operation of the first workstation $WS_{01}$, drill bits 104 may be consumed by wear or breakage, and occasionally, a new supply of drill bits 104 may need to be loaded into a holding bin HB of the first workstation $WS_{01}$ to restock that station. The remaining workstations to be described ($WS_{02}$-$WS_{06}$) may similarly need to be restocked with consumable tools and/or parts, but for the sake of brevity, the specific restocking requirements of each of the stations will not be described in detail.

A second workstation, $WS_{02}$, mounts predrilled plates 105 on the workpieces $WP_{xx}$ passing therethrough. A third workstation, $WS_{03}$, inserts plural fasteners (screws) 106 through plural holes in the predrilled plates 105 such that the fasteners 106 project into previously drilled holes 103 of the workpieces $WP_{xx}$ to thereby fasten the plates 105 to the workpieces. A fourth workstation, $WS_{04}$, cuts grooves 107 into the sides of the workpieces using a groove-cutting tool 108. Finishing operations such as polishing or painting may be performed by yet a fifth workstation, $WS_{05}$. At an exit node 110, a sixth workstation, $WS_{06}$, performs an inspection operation using sensing devices 109.

If the workpieces $WP_{xx}$ are found to pass inspection at the exit node 110, they are forwarded to a subsequent portion of the factory, but if an inspected workpiece $WP_{xx/}$ is found to be defective (incomplete) and it is determined that additional work has to be performed on the workpiece $WP_{xx/}$, the workpiece is routed from the exit node 110 back to the entry point 102 of the production line PL for further work.

Each of the workstations, $WS_{01}$-$WS_{06}$, can develop a unique problem which may affect the work load of other workstations along the production line PL. By way of example, let it be supposed that the third workstation, $WS_{03}$, is running low on its stock of fasteners (screws) 106. It may be desirable, for the purpose of maintaining continuous and efficient production on the factory line PL/AWS, to alter the operation of the third workstation $WS_{03}$ so that only one rather than a plurality of fasteners 106 are initially inserted into the workpieces for holding down their respective plates 105 when the workpieces first pass through the third workstation $WS_{03}$. This altered operation is maintained temporarily while the supply of fasteners 106 remains low. At exit point 110, incomplete workpieces are redirected back to entry point 102 for later insertion of more fasteners 106 once the supply bin HB of the third workstation $WS_{03}$ has been restocked.

It will be appreciated that the questions posed earlier, respecting the believability of an out-of-stock message received from a particular workstation X, apply here and that a soon-to-be-described expert control system (ECS) 120 is to be coupled to the factory line PL/AWS in order to intelligently manage the latter.

For the purpose of connecting to a central management system, each of the PLC's of workstations $WS_{01}$-$WS_{06}$ has a corresponding communication port (connector) 111-116 through which the PLC may communicate with a centralized expert control system (ECS) 120. Data exchange occurs via an appropriate communication network 121 such as a local area network (LAN) Communication can take place by way of serial data packets or parallel ribbon cables or any other suitable method. The concept to be appreciated here, regardless of the selected communication scheme, is that the ECS 120 can receive a large amount of data (i.e., hundreds of bits or more) from the plural PLC's of the workstation array AWS and that the ECS 120 must be able to expeditiously deal with the received information.

The ECS 120 of this invention is preferably partitioned into subsystems 120a–120d and modules 122, 124, 126, 128. The subsystems and modules may be coupled to one another in a variety of ways depending on various development/use phases occurring during the lifetime of the ECS 120.

A core subsystem 120a of the ECS is used during both design/development of an ECS knowledge base (the latter of which is preferably conducted off-line) and during on-line (real-time) management of the factory line PL/AWS. A development subsystem 120b of the ECS is preferably used in conjunction with the core subsystem 120a only when rule-base trees 124 are being developed (preferably off-line) for use within the core subsystem 120a. An off-line PL/AWS modeling subsystem 120d (also referred to as the PL/AWS model 120d) subsystems, 120a and 120b, to enable off-line development and debugging of the rule base trees 124. The PL/AWS model 120d can be coupled indirectly to an inferencing engine module 128 of the ECS through a communications module 122 or the model 120d can be coupled to bypass (BP) the communications module 122 and directly interface with the inferencing engine module 128. In the latter case, the specific interconnection needs of a unique factory line PL/AWS are hidden from the developer. Development can also occur with the PL/AWS model 120d partially or completely disconnected (NC) from the core subsystem 120a such that the latter receives some or all of its stimulus from the real factory line PL/AWS and respectively receives some or none of its remaining stimulus from the model 120d. For the purpose of differentiation, the actual factory line PL/AWS will be sometimes referred to here as the "real" PL/AWS and a software (and/or hardware) model of the factory line will be referred to as the PL/AWS"model".

An operator terminal subsystem 120c of the ECS provides users (operators) with control and monitoring capability during both design/development and on-line use of the ECS 120. Preferably, the operator terminal subsystem 120c includes a display means for displaying messages to a human operator, and menu selection buttons for enabling the human operator to select options offered by the displayed menus.

A second terminal (computer workstation) 125 provides access to the knowledge-base development tools modules 126 of the ECS 120, preferably only during development. Access to the internal rule base trees 124 of a specific core subsystem 120a is preferably provided through a secured communication channel 127 having complementary encrypter/decrypter means provided in the core subsystem 120a and the second terminal 125 so that only authorized personnel (those provided with a suitable decryption key) can access/modify the rule base trees 124 of the specific core subsystem 120a. Such a security system gives human factory managers the ability to control both the number of developers who can modify the knowledge base of a specific ECS 120 and the time when such modification can take place.

A security enclosure 123 (i.e., metal box) is preferably provided to securely enclose the hardware of at least one assembly of the knowledge-base modules 124, the inferencing engine 128 and a soon-to-be-described communications module 122 so that these assembled modules cannot be easily accessed (altered) by unauthorized personnel. Preferably, the security enclosure 123 is used only for a particular one ECS 120 that is predesignated for managing a particular real factory line PL/AWS in realtime. Other combinations of development modules 126 and "test-run" core subsystems 120a of the ECS do not need to be so protected. They are preferably made easily accessible to those who wish to develop new rule base trees, the latter trees being ones that are to be first proven out against the factory model 120d before being "downloaded" into the one "on-line" ECS 120 (the secured ECS) that is managing the real factory line PL/AWS.

A communications management module 122 is included in the secured portion 123 of the ECS 120 for managing the interchange of messages between the workstation communication ports 111–116 of a particular factory line PL/AWS and the expert control system (ECS) 120. For the case where each PLC has a different hardware configuration, and as a consequence, each of the communication ports 111–116 has a different pin-out configuration, the communications management module 122 is assigned the task of mapping the messaging bits of the different PLC's from generic interface port pins (not shown) on the inferencing engine to their corresponding pins on the communication ports 111–116 in accordance with a predetermined design. The communications management module is further assigned the task of establishing low level communications parameters such as parity odd/even, number of stop bits, etc. The communications management module 122 can accordingly function as an application-specific interface for coupling a generic inferencing engine module 128 to a specific (real) factory line PL/AWS. By keeping the architecture (i.e., wiring) of the communications module 122 secured within the security enclosure 123 it is possible to prevent unauthorized personnel from learning about its specific structure and from directly tampering with the operation of the real factory line, PL/AWS.

Messages received from external devices (i.e., the PLC's of stations $WS_{01}$–$WS_{08}$) provide the expert control system 120 with "evidence" data which the ECS 120 may use for determining what is actually occurring on the real factory line PL/AWS (or what is being simulated as happening in the PL/AWS model 120d). The received messages cannot always be taken at face value because, as indicated before, one or more of the PLC's may be malfunctioning and providing erroneous information. Conclusions are preferably reached by weighing many pieces of evidence and using heuristic guidelines to arrive at conclusive determinations.

The ECS 120 is accordingly, preferably programmed to combine the "evidence" data which it receives from the communications management module 122 (or from the model 120d through the bypass path BP) with inferencing rules provided in one or more rule-base trees of an included number of one or more knowledge-base modules 124 (to be described shortly) in order to "infer" what condition actually exists on the real factory production line PL/AWS (or is being simulated to occur, during development, in the PL/AWS model 120d) and in order to decide, based on such inference, what course of action or inaction should be next taken.

The inferencing of "facts" based on received "evidence" data can be explained as follows. Referring still to FIG. 1, let it be assumed that the PLC of the third workstation, WS$_{03}$, issues the message "I-am-out-of-stock" to ECS 120 but that the same PLC has not been earlier heard to issue a message of the form "I-am-running-low-on-stock". Let it further be assumed that inspection station WS$_{06}$ continues to inform the ECS 120 that all of the workpieces WP$_{xx}$ passing through exit node 110 have the desired number of fasteners 106 properly inserted in them and that this status applies even to workpieces that have already passed through workstation WS$_{03}$ after the latter station issued the out-of-stock message.

Under such conditions, a human expert might infer that workstation WS$_{03}$ is still properly inserting fasteners 106 even though a contrary status message is being received from the PLC of the third workstation. Alternatively, the human expert might infer that the inspection station WS$_{06}$ is in error and that the message received from fastener station WS$_{03}$ is correct. The choice of what should be inferred is left to the human expert. Without specific knowledge about the likelihood of one occurrence over another on a specific factory line PL/AWS it is not possible to know what weight should be attached to each piece of received evidence data and it would be purely speculative to choose one inferencing path over the other. For this example it will be assumed that the first path of inferencing is chosen.

An inferencing rule corresponding to the way the human expert would reason through the above-posed dilemma of our example is then programmed into the knowledge base modules 124 of the ECS 120 using if-then constructs. By way of example, a specific knowledge base module 124-x (not shown) might be programmed to include a construct of the form: "IF WS$_{06}$-reporting-okay is true (T) AND WS$_{03}$-reported-low-stock is false (F) AND WS$_{03}$-reporting-out-of-stock is true (T) THEN ignore-out-of-stock-message-from-WS$_{03}$ is true (T)". Such a construct can be formed in software as an AND/OR matrix-structured list of variables (i.e. matrix 53 of FIG. 5) as will be described shortly after the overview description of the ECS modular structure is completed.

Preferably, the ECS 120 is further provided with one or more knowledge-base development tools modules 126 for allowing developers to easily construct plural rule base trees, link such trees one to the other and display the structure of such trees either graphically or symbolically as preferred by the person who is developing the knowledge base. Access to the development tools modules 126 and terminal 125 does not have to be restricted with a security enclosure 123. A twin (test-run) version of the core subsystem (such as 120a-2 shown in FIG. 9) is preferably provided, coupled through the bypass BP line with the PL/AWS model 120d for enabling off-line development of rule base trees. The computer workstation (second terminal) 125 can be provided in the form of a Macintosh II TM system available from Apple Computers Inc. of Cupertino, California, or an IBM AT TM system available from IBM of Armonk, New York, or any other suitable computer. Choice depends on the preferences and needs of different application developers. The twin core subsystem (i.e., 120a-2 of FIG. 9) PL/AWS model 120d and development tools 126 are preferably all defined in software and simulated by the computer of the development (second) terminal 125. The presently contemplated workstation system (second terminal) 125 includes a Macintosh II TM which is bundled with a Hypercard TM (Apple Computers) style user-interface program. Users switch from one development mode to another by means of a point-and-click device ("mouse") which is used for selecting menu screens and options from the selected menu screens. The options include choices of how to define rule base formulations (branches), how to establish test run problems in the PL/AWS model, when to start/stop simulation and whether to trace through various portions of the simulated inferencing operations.

Figure 2:
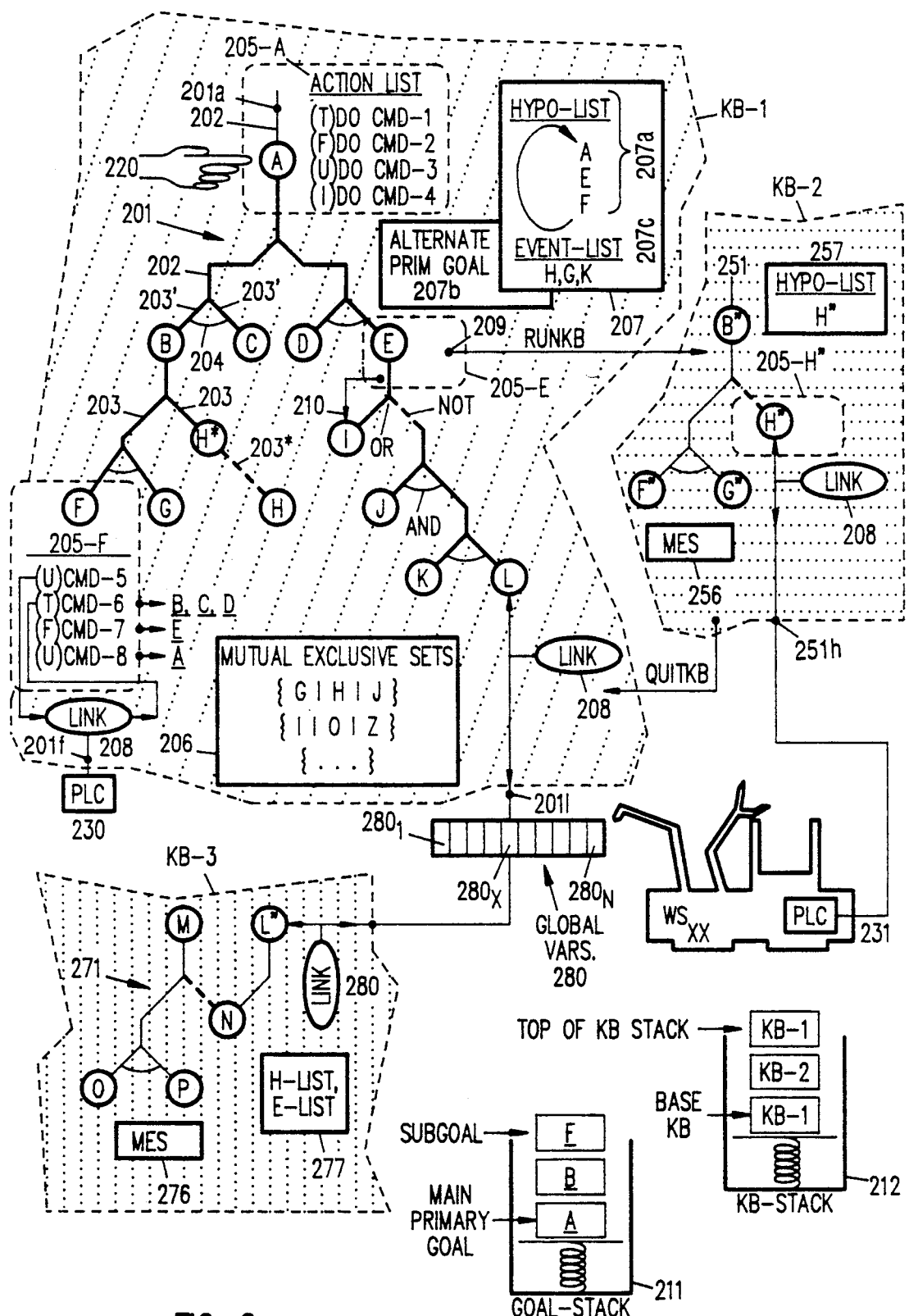
FIG. 2 is a diagram of a plurality of rule base trees for showing how the state of variables within any one tree can be changed through nonmonotonic reasoning and how referencing certain variables can immediately actuate prespecified actions causing a jump from one tree to a second tree even though the status of some variables in the first tree remain unresolved.

Referring to FIG. 2, three entities, KB-1, KB-2 and KB-3, which will be referred to here as "knowledge-base modules" are each represented as being contained within three respective closed curves. Knowledge-base module KB-1 is shown to be composed of a plurality of multi-state variables A, B, C, . . . , L (each capable of taking on at least the values T, F, U and I) coupled to one another by relational operators (i.e., AND, OR, NOT) so as to define a first relational tree 201. Preferably, the variables A-L are restricted to taking on only the four values, T, F, U and I, and the logical operations thereon are restricted to only AND, OR, NOT and MES (to be explained) so that inferencing speed can be maximized. Similar relational trees, 251 and 271, are shown to be defined respectively within the second and third knowledge base modules, KB-2 and KB-3.

The first relational tree 201 is shown to be organized from top to bottom (branch tips to roots) in the form of vertical stems 202 passing through circled variable nodes A, B, E, etc., (underlined capital letters are used here to denote variables of different names) and angled branches 203, 203', 203* emanating downwardly from the vertical stems 202 to connect to other variable nodes. Angled branch lines 203' which are coupled to one another by an arc 204 indicate an AND relation. Angled branch lines 203 which are not linked by an arc 204 indicate an OR relation. Dashed branch lines 203* indicate a NOT relation. (It is to be understood that the specific logical operations and interrelations shown in FIG. 2 are so arranged merely for the sake of illustrating the invention and that the simplicity of the illustrated tree structures should not be construed as a limitation on the complexity of tree structures which might be developed by practicing the invention.)

In the illustrated first knowledge-base module, KB-1, the relation between variables A, B, C, D and E can be expressed as A=(B AND C) OR (D AND E). This equation may be read to mean A is true if either B and C are both true or if D and E are both true. The shorthand notation for this relation is A=B&C!D&E. The illustrated relationship between variables B, F, G and H may be expressed as B =F&G!/H where the slash indicates a NOT operation on the value of variable H. Variables H and H* are related to each other by the NOT connection 203*.

According to the invention, variables which have the same name but are either appended with a special character (asterisk "*") or not so appended, are automatically defined to be NOT complements of one another. The ECS 120 of this invention includes complementing means (i.e., 429 of FIG. 4B) for automatically setting the values of NOT complements to opposed states once the values of their counterparts are established as true or false (T or F).

In addition to the AND, OR and NOT relationships between variables, as symbolized by the angled/dashed branches 203(')(*) of the tree structure 201, certain ones of the variables (i.e., G, H, J) may be defined as belonging to one or more mutually exclusive sets (MES) 206. (Differently colored connective lines could be drawn through the tree to symbolize the MES interrelations if desired, but for the sake of clarity such connective lines are not shown in FIG. 2 and a "MES" table list format 206 is used instead.) The term "mutually exclusive" means here that no more than one variable within a particular mutually exclusive set (MES) can be true (T) at any one time. If one variable in a particular MES 206 is established to have the value true (T), the remaining variables of that set may be automatically inferred to be false (F). Like the first knowledge base KB-1, each of the second and third knowledge base modules, KB-2 and KB-3, has a corresponding MES table, 256 and 276. The ECS 120 of this invention includes a mutual exclusion establishing means which automatically sets (i.e., 428 of FIG. 4B) the values of other variables in an MES to false (F) once a single variable in that set is concluded to be true (T) and which optionally automatically resets (i.e., 431 of FIG. 4B) such induced false values to untested (U) if the true value of the single inducing variable is later retracted.

Aside from establishing the value of a rule-base tree variable by means of logical operations, mechanisms are included for allowing a variable within a first rule-base tree (i.e., L of KB-1) to acquire (inherit) the value of a second variable (i.e., "L" of KB-3) in a second rule-base tree or to acquire the Boolean value (T or F factual value) of a contact point in an external PLC (i.e., 230 and 231). Links 208 within each rule-base tree, KB-x, identify both the possible sources and possible destinations of information to be transferred between nodes in a local rulebase tree, KB-x, and external points. A global variable array 280 is used as an intermediate storage means for transmitting a conclusion (T, F, I, U) reached in a first rule-base tree (i.e., KB-3) to a root-node (i.e., L) in a second, higher-level, rule-base tree (i.e., KB-1). The global variable array 280 comprises a predetermined number N (i.e., 256 or 512) of number-identified cells, $280_1$ through $280_N$, for transferring information. These cells, $280_1$ through $280_N$, of the global variable array 280 do not have any "meaning-providing" character-string attached to them for providing a meaning to a logical value (T, F, U, I) temporarily stored therein. A logical value (T, F, U, I) acquires a "meaning" only when it is attached to a meaning-providing character string such as "machine-x-out-of-stock" that is preferably included within the name of a rule-base tree variable. The global variable array 280 may be used to transfer generic-logic information (no meaning directly attached to TFUI value) between any two variable nodes of either the same or different trees. The information-exchanging nodes can have the same or different meanings attached to their logic values by way of their variable-name character strings.

To assure that a generic-logic value from a first (i.e. L') of two information-duplicating nodes (i.e. L and L') is loaded into a specific global-variable array cell $280_x$ and the same cell $280_x$ is used as the information-source for establishing the logic value of the second (i.e. L) of the twin nodes (L and L'), it is preferable to include a verifying means for comparing source/destination identifying information in the links 208 of the twin nodes (L and L') and verifying that a first of these twin nodes has a send command (i.e. "setglobalvariable") designating the same global cell $280_x$ designated by a receive-command (i.e. "getglobalvariable") in an "actions-list" of its twin node (L). This verifying means is preferably formed of a computer program utilized during design, development and testing of a set of knowledge-base trees but is not thereafter used during real-time operations.

In accordance with the present invention, a variable (having a "meaning-providing" character string included in or attached to its name) can take on a "factual" value of being either true (T) or false (F) when enough "evidence" has been accumulated to infer such a factual conclusion. A variable takes on the value of being indeterminate (I) when some evidence has been accumulated for establishing the value of that variable (i.e., the variable has been looked at ["touched"] one or more times) but the evidence is insufficient to allow the system to conclude that the variable is either true or false. A variable (goal) takes on the value of untested (U) when no evidence has yet been accumulated about that variable or when a conclusion about the goal variable is absolutely predicated on the value of another (subgoal) variable such that it would be futile to attempt evaluation of the goal variable without knowledge about the other variable and that other (subgoal) variable is untested, or when all previously collected evidence has to be discarded as a result of changed conditions.

When the ECS 120 is first turned on, it is preferable to initialize all variables within its rule trees 124 (i.e., 201, 251, 271) to the untested (U) value. Evidential information is then allowed to percolate up the trees from their roots (i.e. 201f) to their branch tips (i.e. 201a) as will be described shortly in order to transform each rule base tree from an initially unbiased state to a historically biased state. When a conclusion is reached at a branch tip (i.e. node A), a value-triggered action is preferably taken to transmit the conclusion to an external point such as the contact point of an external PLC or a "twin" node in another rule-base tree (i.e., by way of the global variable array 280).

FIGS. 3A through 3D illustrate a set of truth tables in accordance with the invention for determining the value of a first variable, A, based on the value of related variables, B and C. FIG. 3A shows the AND relation, A=B&C. FIG. 3B shows the OR relation, A=B!C. FIG. 3C shows the NOT relation, A=/B, and FIG. 3D shows the MES relation, A|B|C. Generally speaking, the first variable, A, takes on the untested value (U) either when none of its related variables, B and C have been tested or when it would be futile to attempt to evaluate the first variable A because necessary ones of its related variables are untested (U).

It is to be understood, of course, that the invention is not limited to the logical operations (AND, OR, NOT, MES) specifically shown and that operations defined by different "truth tables" are also contemplated. With respect to the MES relation of FIG. 3D, the symbol x indicates that the condition as referenced by the values of B and C is not possible. By way of example, in the MES relation, A|B|C, it is not possible for both of the related variables, B and C to be true (T), therefore the corresponding A box is marked "x".

Referring to FIG. 2, each of the knowledge bases, KB-1 through KB-3, has a respective inferencingactuating means 207, 257 and 277, which functions to actuate an inferencing operation by identifying as a "primary goal" one variable whose factual status (T or F) is to be established. In accordance with the invention, an inferencing operation may be actuated by either inserting the name of a primary goal in a hypothesis list 207a (referred to also as the "hypolist") and/or by inserting the name of the primary goal in an "alternate primary goal" box 207b (which takes temporary priority over the hypo-list) and/or by repeatedly evaluating an activating-variable whose name is listed in an event-list 207c and designating a corresponding (same or different) variable name as an event-triggered primary goal which is to be evaluated when the state of the activating-variable changes. The event-list 207c triggers an evaluation of the event-triggered primary goal whenever the activating variable (which could be the same as or different than the event-triggered goal) changes condition (i.e., changes from a true value (T) to one of the other three states). The hypo-list 207a is a wrap-around list through which the inferencing engine cycles, continuously attempting to evaluate the variables (hypotheses) named in that wraparound list. The alternate primary goal box 207b holds the name of a variable whose evaluation is to take precedence over the evaluation of other variables listed in the hypolist 207a and/or events-list 207c. Pointers to primary goals and their subgoals may be stored in a push-down/pop-up stack 211 (goal-stack) as schematically illustrated in FIG. 2.

The "current" knowledge-base, KB-x, upon which the ECS operates is defined by a KB name (or pointer thereto) at the top of a push-down/pop-up stack 212 (KB-stack). The KB-stack 212 can hold multiple names identifying different knowledge bases or a same knowledge base more than once.

Referring to the first knowledge base KB-1 of FIG. 2 (which is shown to be initialized to contain the hypo-list 207a: A, E, F), let it be assumed that this is the current (top of KB-stack) knowledge base and that all variables in its corresponding tree 201 have been initialized to the untested value (U). The inferencing engine 128 (FIG. 1) variable A, which at first has the untested value (U). The inferencing engine 128 then searches through the rule base tree 201 for a tree node holding the variable name A and "points" to this node as indicated by the pointing hand symbol 220 in FIG. 2. A tree node is considered to be "touched" when it is so pointed to. (The node name A is pushed onto the top of the goal stack 211.)

Figure 4A:
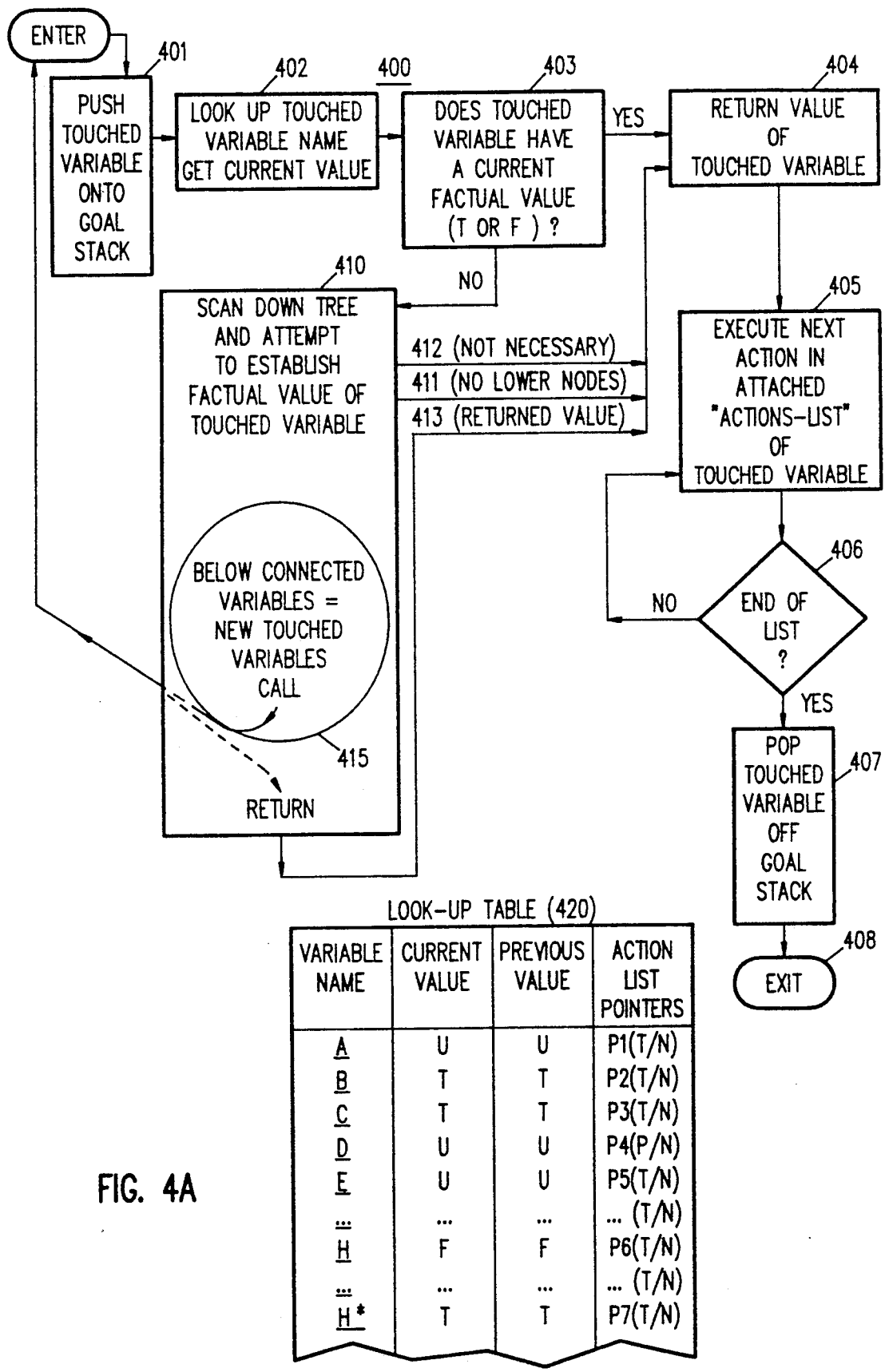
FIG. 4A is a flow chart showing how "actions" attached to variables of a rule base tree may be triggered when the variables are respectively evaluated.

Referring to FIG. 4A, the inferencing engine 128 (computer) then enters a variable evaluation process 400 which has reentrant capabilities. At step 401, the addressing hand 220 of the inferencing engine 128 is pointing to the variable node containing the variable name which is to be evaluated (in this case the variable A) and the name of the pointed-to variable (or pointer thereto) is pushed onto the goal stack 211 thereby designating that node as the "touched" node. At step 402, the inferencing engine addresses a lookup table 420 containing the name, current value, previous value, action list pointers (i.e., Pl(Top/Next) pointers) and other linked attributes (i.e., MES pointers, not shown) of the pointed-to variable (the "touched" variable A) and obtains its current value. At step 403 the engine determines whether the touched variable has a factual value of either (T) or (F). If it is found at step 403 that the value of the touched variable (A) is in the factual range, (T) or (F), then at step 404 the value of the touched variable is returned (i.e., in an accumulator register) and that returned value (T or F) is used at step 405 to optionally actuate the next (as designated by next pointer Pl(N) of the "touched" variable) one or more of a predetermined number of "actions" in an action list 205 (also referred to as a commands list 205) which is "attached" (linked through a top-of-list pointer, Px(T), x designating a particular variable here) to the touched node of the tree.

Referring to FIG. 2, the touched node containing the variable name A is shown to have attached thereto an action list 205-A which triggers the ECS 120 to sequentially execute a first command, Cmd-1, if the value of the touched node is returned as (T); to execute a second command, Cmd-2, if the value of the touched node is returned as (F); to execute a third command, Cmd-3, if the value of the touched node is returned as (U); and to execute a fourth command, Cmd-4, if the value of the variable in the touched node is returned as (I). Root node F is shown to have a similar action list 205-F and emergency node E is to have yet another such action list 205-E. Other nodes of the trees shown in FIG. 2 may or may not have corresponding other action lists (i.e., 205-H") but for the sake of schematic simplicity only a few are shown.

The structure of the action lists 205 and the various commands which can be implemented therethrough will be discussed in more detail later. For now, let it be assumed that the action list 205-F of root node F has a command, Cmd-5, that is a PLC status reading command (i.e. "readplc") which automatically fetches a boolean value (T or F) from an input-block memory cell (i.e., 122i of FIG. 10) which is mirroring the state of a contact point in PLC 230 and that this command, Cmd-5, sets the value of node F accordingly. Let it be further assumed that PLC 230 sends a value (T) to the root node F and that the action list 205-F of the root node includes a subsequent command Cmd-6 which, upon the setting of root node F to the value true (T), activates a series of state-setting functions (i.e., "setfact") which automatically force the values of the variables B and D within that tree 201 to each be set equal to the true value (T) and the variable C equal to false (F). Moreover, let it be assumed that action list 205-F includes a malfunction command, Cmd-7, which forces the inferencing engine to begin evaluating emergency node E as its new primary goal (i.e., "rungoal") in case command Cmd-5 returns a false (F) instead of a true (T) within a predetermined time period. The failure of PLC 230 to return a true (T) response within the predetermined time period is assumed here to indicate a malfunction and emergent actions are subsequently taken in the actions list 205-E of emergency node E.

It should be appreciated from the above described actions, that although the nodes containing the variables B, C and D had the value of untested (U), these initial values can be arbitrarily changed to any other value according to the invention at any time during inferencing by means of a command within an action list 205 (i.e., 205-F) attached to an arbitrary variable (i.e. root variable F) within the tree 201. It should also be appreciated from the above, that although the rule base tree 201 has branches for guiding the inferencing engine along a "normal" path of reasoning, from one node to the next, that certain commands (i.e. Cmd-7) can cause the inferencing engine to abandon the evaluation of a first primary goal and immediately begin evaluating a new primary goal when emergent conditions develop, i.e., when PLC 230 returns an unexpected false (F), indicating perhaps a malfunction, instead of an expected true (T).

Returning to FIG. 4A after executing the "next" action in the attached action list (i.e., 205-A) of the "touched" node (i.e., A) at step 405 (we will assume for now that A has acquired a factual value as a result of some action taken elsewhere and we will later explain how A can acquire such a value by means of a tree "down-chaining" operation), the inferencing engine moves on to step 406 where it determines if the end of the attached actions list 205-A has been reached. If the end of the actions list has not been reached, the inferencing engine returns to step 405 to execute the "next" action on the action list (which could be pointed to by a next-action pointer, Pl(N)).

If the end of the action list has been reached, the computer removes the name of the touched variable from the goal stack (211) at step 407 and then exits the evaluation routine 400 at step 408. Upon exiting the evaluation routine 400, the inferencing engine returns to the hypothesis list 207a (or other inferencing-activating module, i.e. 207b or 207c) and begins to evaluate the next primary-goal variable indicated by such inferencing-activating module.

It should be appreciated that some types of commands (to be referred to as procedure attachment commands) such as the "setfact" command can alter the state of not only the target variable (which is being set) but also should logically have effects which ripple up/down the tree to change the value of variable nodes higher-up/lower-down on the tree whose logical states are predicated-on/logically-produce the value of the target variable. The ECS system of the invention has "cleareffects" and "clearcauses" commands to enable an expert user to account for such rippling effects. More will be said about these commands later (see FIG. 4B).

Referring back to step 403 of FIG. 4A, if the touched variable does not have a factual value (T) or (F), as is the case when variable A is initialized on power-up of the ECS to the value (U), the inferencing engine 128 attempts to evaluate the touched variable at step 410 by chaining down through the tree according to a recursive (reentrant), depth-first, breadth-second algorithm as will now be described. If there are no lower nodes coupled to the touched node, a jump 411 is made back to box 404 returning whatever value the touched node has to begin with. If there are lower nodes coupled to the touched node, but upon scanning down tree the computer discovers that the required nodes (i.e., B, C, D, and E) for establishing the value of the touched node (A) have already been established through some prior action, and accordingly, evaluation of the lower nodes is not necessary; the computer immediately preforms the logical operations (AND/OR) indicated by its connection to those lower nodes (B-, C, D, and E) and then returns 412 the result of those operations to step 404.

On the other hand, if the computer finds that at least one of the predicate lower nodes of the touched variable does not have a factual value (either true or false), then the computer will attempt to evaluate that lower node and first provide the lower node with a factual value before returning 413 to step 404.

In scanning downward through the rule base tree 201 of FIG. 2 in a top-to-bottom, and then within there, left-to-right fashion, the inferencing engine will discover that the variable node A is directly linked to variable nodes B, C, D and E. The left-most variable B is pointed to (touched) first and the previously described evaluation process 400 is recursively entered (called) from step 415 with node A remaining as the primary goal variable at the bottom of a recursion stack (211 shown in FIG. 2) and node B becoming a subgoal pushed onto the top of the goal stack.

At step 403 of the evaluation process 400, B being the new goal, the computer (ECS 120) will discover that variable B does not yet have a factual value (T or F), and the ECS will jump to step 410, point to the next lower node F, reentrantly loop back through steps 401, 402, 403 and 410, but this time because root node F has no below connected nodes, the ECS jumps 411 to step 404 returning the initial (U) value. The ECS then executes step 405 thereby activating commands Cmd-5 and Cmd-6 of actions list 205-F. The latter command Cmd-6 will alter the values of nodes B, C, and D, as described before, thereby allowing the computer to skip evaluation of nodes G and H, since the necessary predicates for the value of variable B are immediately and directly established by command Cmd-6.

As will be appreciated later, the rule base 201 is normally structured to include a "restartgoal" command Cmd-8 on the condition (U) after command Cmd-7 so that the inferencing engine can opportunistically reevaluate node A repeatedly (as long as a malfunction triggering-time permission period of command Cmd-7 does not run out) until the factual value of nodes B, C, D are established if it is found that F continues to be untested (U) after the first time around that Cmd-5 is executed. Starting again with node A as the touched node, the computer will scan down the tree at step 410 and return a true (T) upon evaluating variable B after Cmd-6 is finally executed in actions-list 205-F. The computer will next point to variable C and recursively evaluate it using the same evaluation process 400. After evaluating C, the computer will recursively return the value of the logical operation B AND C (as will be explained in more detail later) back to the calling point of node A. If the evaluation of B AND C does not conclusively establish the value of variable A (i.e., B&C=(T)) then the computer will continue its search in the stated left-to-right, top-to-bottom, fashion by evaluating D AND E; chaining downwardly therefrom.

For the sake of this example, it was assumed that the untested (U) value of variable D was flipped to the value true (T) when the sixth command (Cmd-6) of node F was executed. Variable E continues to remain untested (U) however. Since the (T), (F), (T) values of respective variables B, C and D do not conclusively establish the value of the hypothesis (primary goal) variable, A, the computer will have to evaluate the value of variable E by chaining down the tree and pointing to variables I and/or J, K, L, etc. At some point down the tree 201, near its other roots (i.e., point 2011) the computer should find either pre-established factual values or action commands which cause the values of the correspondingly attached "root" variables to be established. The values at such lower nodes (2011) are preferably established by fetching Boolean values (T or F) from external devices, such as a PLC 231 of a preselected workstation or from information obtained from another (external) knowledge base (i.e., duplicate node L" of KB-3) whose variable states are linked to the roots of the first knowledge base KB-1 by way of an information linking pointers 208 (through global variables 280).

For the sake of this example let it be assumed that an action of "root" node L sets variables J and K equal to true (T) but sets L equal to false (F). By recursively executing the evaluation process 400, it can be seen that values established in the root nodes of the tree tend to percolate upwardly along the tree branches until eventually they affect the value of the originally touched variable (A) listed in the hypothesis list 207a. (In our example, A will acquire a true value because L acquired a false value and that drives E true.)

If the value of the item in the hypothesis list 207a is not conclusively established during a first cycle through the hypo-list, the inferencing engine cycles through the same question again and again; each time trying to conclusively establish the factual status of the variables listed in the hypo-list.

The rule base tree should, of course, include monitoring commands (actions) such as a "fetchblk" command to be described later, for continuously acquiring updating information from external sources (i.e., PLC 230) so that such information can induce appropriate changes in the values of nodes within the tree 201. One shortcut command for assuring a high speed polling loop is the knowledge base restarting command "restartkb" which will be mentioned later, others are the "rerunkb" and "getgoal" commands to be later described.

Aside from the ability of certain actions (i.e., "setfact" command of Cmd-6) to alter values within a rule base tree, an important feature of this invention is that the action list of any node (i.e., E) can include commands 209 (i.e., "runkb") which push a new knowledge base onto the KB stack 212 (i.e., KB-2 on top of KB-1) and immediately cause the computer to begin executing the evaluation triggering lists 257 of that new knowledge base KB-2 even though there are unresolved variables (goals) in the first knowledge base KB-1 This allows the inferencing engine to quickly drop an inappropriate line of reasoning and adopt a new one when changed conditions so warrant. By way of example, it may be that the factual status (T or F) of variable E must be resolved within a predetermined time frame and if E remains untested (U) by threshold time $t = T_E$ then a command 209 is triggered causing the computer to begin working on new problem H in tree 251 of KB-2 instead of continuing to work on the evaluation of variable E in tree 201. The present invention includes timing permission means for triggering actions on the occurrence within predetermined time frames of one or more prespecified values (T, F, U and/or I).

Figure 4B:
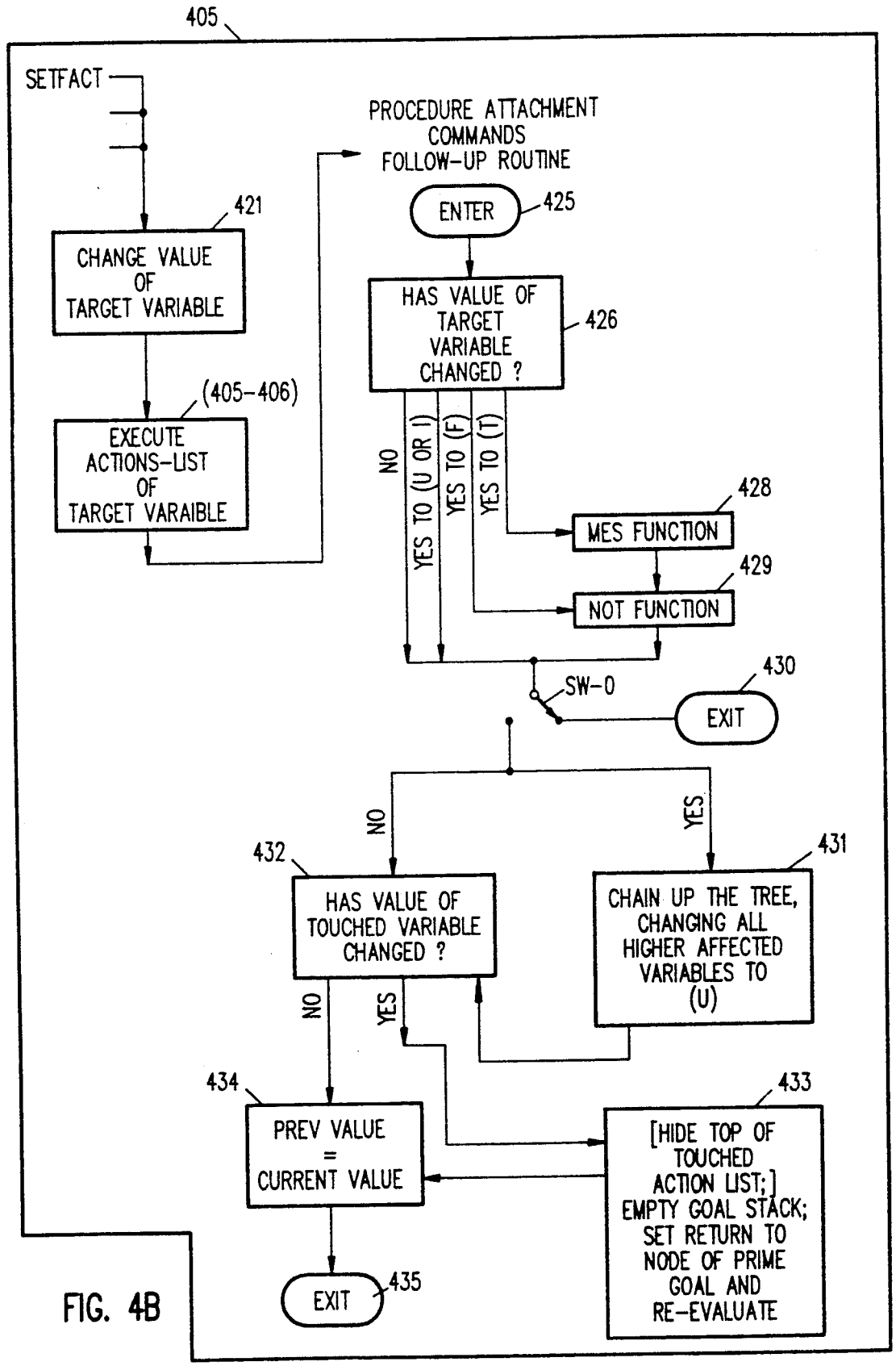
FIG. 4B is a flow chart showing how procedure attachment commands may be followed by opportunistically planned execution of commands attached to a target variable.

Referring to both FIGS. 2 and 4B, in accordance with the invention, when a procedure attachment command such as "setfact" (Cmd-6) is executed, a procedure attachment commands follow-up routine 425 (FIG. 4B) is then preferably executed to determine if the state of any variable might have been affected by the procedure attachment command (Cmd-6) just executed and whether or not the value of the altered target variable (i.e., B, C, D which are changed by command Cmd-6 of action list 205-F) will have repercussions higher up on the tree (i.e. at node A) as a result of the change. This is done by comparing the previous value in the look-up table 420 (FIG. 4A) with the current value at step 426 of FIG. 4B. If the target value has changed, appropriate changes to nodes connected to the target value through mutually exclusive connections (MES) or NOT connections are automatically made at respective steps 428 and 429.

In accordance with one (preferred) variation of the invention, the follow up routine 425 is then exited at step 430 as indicated by the drawn position of the option switch Sw-o.

In accordance with another variation of the invention, if the value of the target variable has changed, then at step 431, the computer automatically chains up the rule base tree changing all higher effected variables to untested (U). (This is an automatic execution of the "cleareffects" command.) This chaining upward along the tree at step 431 can also change the value of the touched variable. Accordingly, at step 432, regardless of whether the answer to step 426 was yes or no, the computer determines whether the value of the currently touched value (i.e., A) has also changed as a direct or indirect result of the most recently executed action. (In FIG. 2 for example, action 210 of variable E changes the value of its below connected variable I and alteration of I can ripple upwardly to change the value of E because $E = I!/(J\&K\&L)$.) If the answer to step 432 is no, the previous value entry of the touched variable in the lookup table 420 is updated to equal the current value at step 434, the computer then exits 405 at step 433 and jumps to step 406 (FIG. 4A). If there are no more actions in the action list 205, the inferencing engine exits the evaluation routine at step 408 to return therefrom back to the calling routine (in this case, the hypo-list 207a where the engine will next begin evaluation of the next listed top goal, E).

If the answer at step 426 (FIG. 4B) is yes, and the new value of the action-altered variable is true (T), then the inferencing engine will search through the mutually exclusive sets 206 at step 428 to automatically set as false (F) the states of all other variables which are mutually exclusive to the action-altered variable.

At step 429 (FIG. 4B), if the new value of the changed variable is true (T) or false (F), the ECS 120 searches through the lookup table 420 for a NOT complement of the changed variable and updates the latter.

Figure 5:
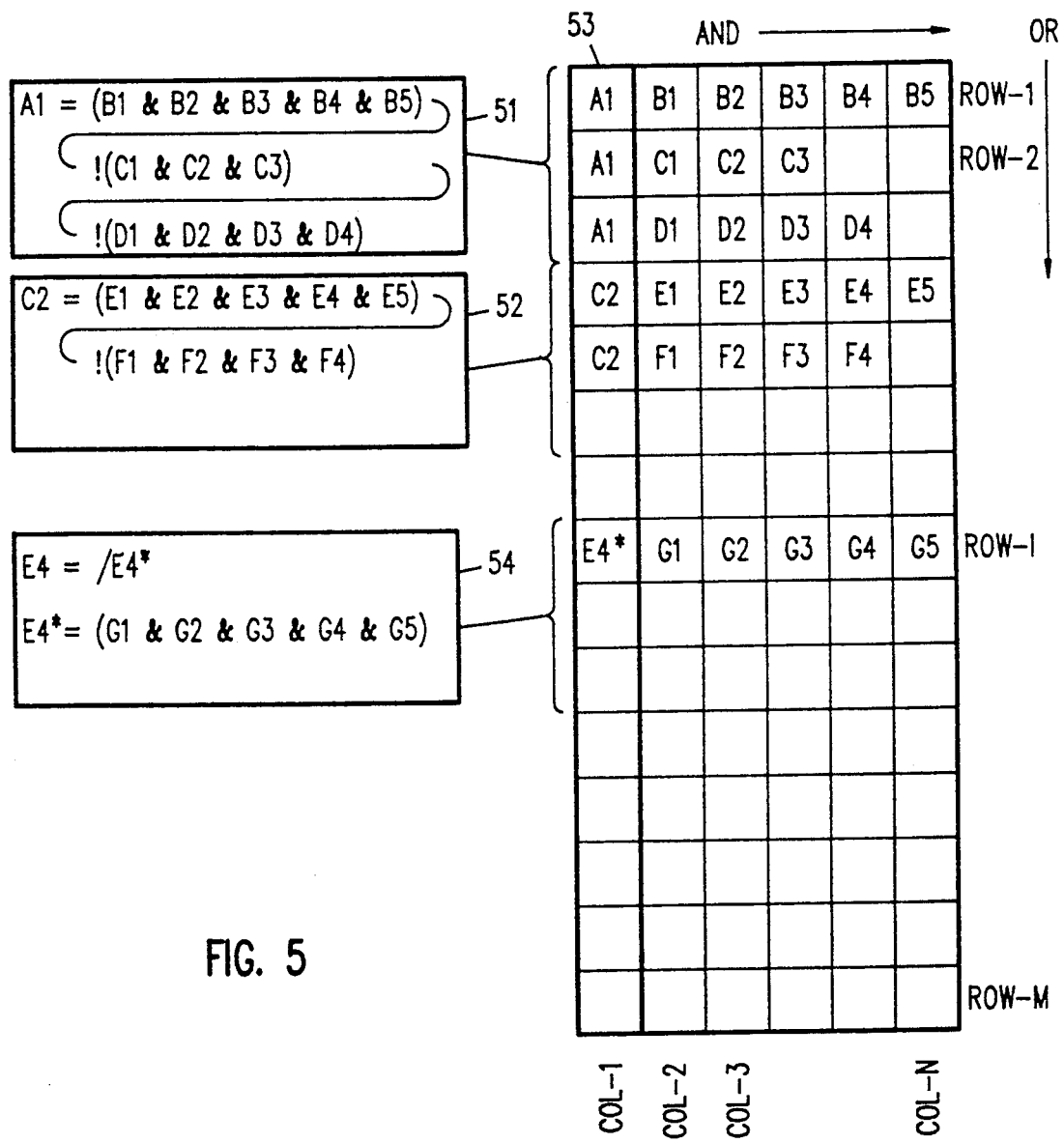
FIG. 5 shows a data structure for quickly performing AND/OR operations and backward chaining operations.
Figure 8:
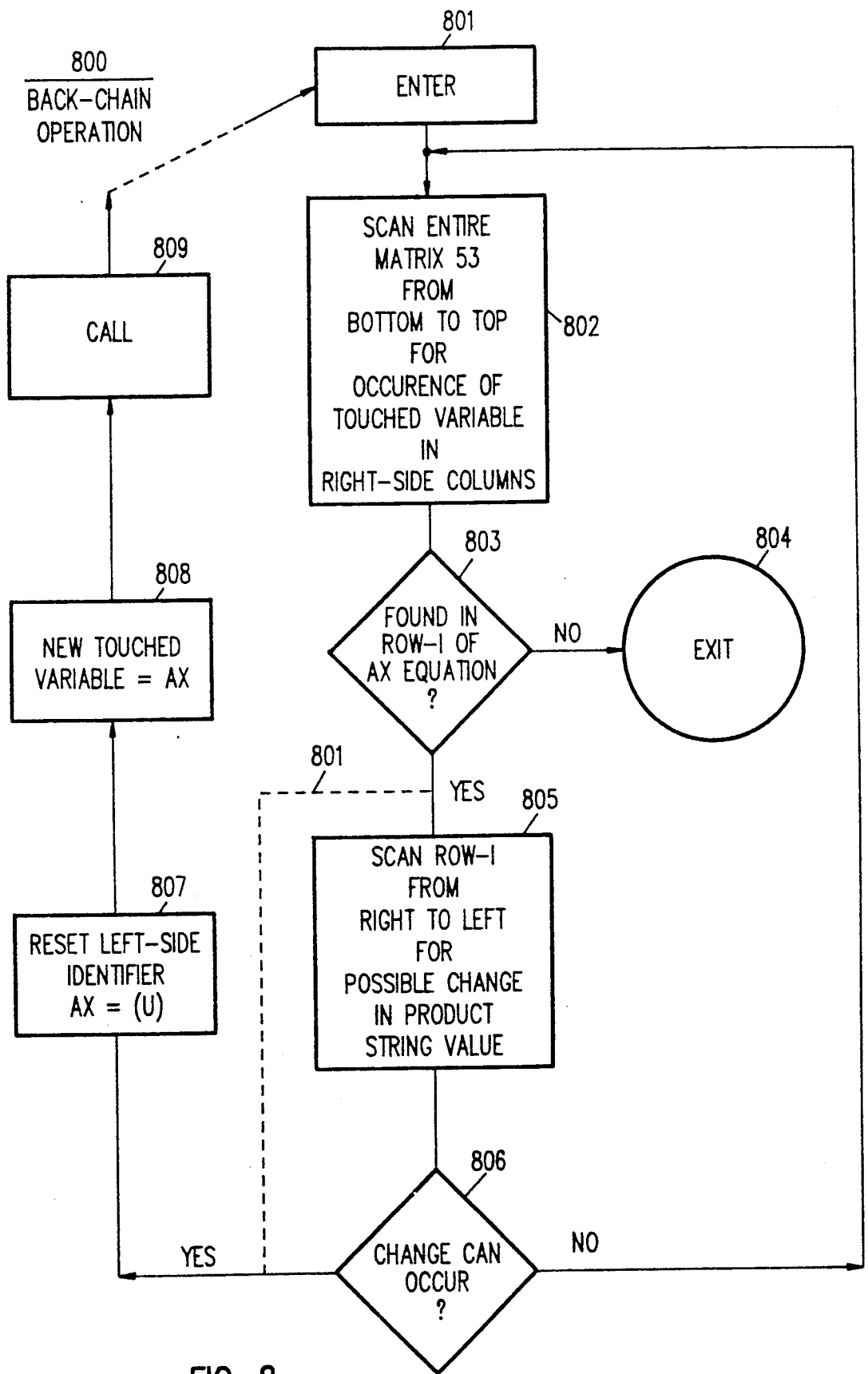
FIG. 8 is a flow chart showing an upward (back) chaining operation in accordance with the invention.

If the option switch Sw-o directs the ECS to one of steps 431 and 432 (FIG. 4B), then at step 431, regardless of whether the variable has changed to true, false or the other two values (U or I), the inferencing engine begins to chain upwardly through the tree searching for all higher positioned variables (connected to the changed variable) whose values could be affected by the changed value of the touched variable and automatically changes the values of these higher up variables to untested (U). This upward chaining (back-chaining) function 431 works its way through MES and NOT connections as well as through the AND/OR connections. When the chaining upward function 431 reaches a node above which there are no other variables that could have been affected (i.e., a branch tip), the inferencing engine advances to step 432 to determine whether the touched variable (i.e., A) has been changed by the chaining up operation of step 431. Upward chaining will be more fully discussed when FIGS. 5 and 8 are explained below.

If the value of the "touched" variable is found to have been so changed at step 432 (FIG. 4B), then the "top" of its action list 205 may be optionally suppressed (by not resetting the next action pointer Px(N) equal to the top of action list pointer Px(T)) at step 433 (the optional portion of step 433 is bracketed "[ ]") and, because the touched variable is somehow linked to a primary goal being evaluated, reevaluation of the primary goal is repeated without repeating the suppressed top portion of the action list 205 of the touched variable.

After optional step 434, the inferencing engine exits step 405 at 435 to complete the remaining actions by way of step 406 (FIG. 4A) and then exits back to the calling routine at step 408. If step 433 has been executed, the return is back to the node of the primary goal where reevaluation begins.

Referring to FIGS. 5-8, it will be now be explained how rule base trees are preferably structured, at least during real-time inferencing, in accordance with the invention so that inferencing speed can be maximized and how the inferencing engine 128 recursively chains downwardly and upwardly through the rule base trees to find logical linking paths and establish the values of selected nodes therein.

Referring to FIG. 5, let it be assumed that a variable A1 is to be a complex AND/OR function of the variables B1 through B5, C1 through C3 and D1 through D4 as indicated by the "sum of products" equation shown in block 51 of FIG. 5. Let it further be assumed that variable C2 is to be an AND/OR function of variables E1-E5 and F1-F4 as indicated in equation block 52. When the equations of blocks 51 and 52 are entered into the ECS 120 (using the development workstation 125 and development tools 126 bundled therewith), a rectangular functions-matrix 53 (or a functional equivalent thereof) of dynamically expandable dimensions is preferably constructed in the memory of the computer. The functions-matrix 53 is arranged so as to operatively have an orthogonal structure of rows and columns such as shown in FIG. 5 defining by implication different logical functions such as AND and OR and the sequence in which these functions (operations) are to be performed. A separate row (i.e., row-1) is reserved for each product string (each set of one or more AND connected variables such as B1-B5) of the AND/OR equations to be represented in the functions-matrix 53. At least one column (i.e., col. 1) of the matrix 53 is reserved for identifying the variable name (i.e., A1) appearing at the left side of each equation block to which a product string (i.e. B1 & B2 & B3 & B4 & B5) belongs. OR connections between product strings are denoted by the fact that such product strings share a common left-side variable name in the at least one column (col. 1) of their respective matrix rows. Equations consisting of AND and OR relations may be represented using such a matrix form 53.

Since the AND and OR operators of each equation block (i.e., 51, 52) are implied by the orthogonal structure of the functions-matrix 53 instead of being expressly indicated by a special operation-identifying character (i.e., "&" or "!") that has to be stored in a memory of the ECS 120 and addressed through memory addressing means, the memory size and evaluation time of the ECS 120 can be minimized. By methodically evaluating product strings (AND-couplings) and OR-couplings in an ordered manner as will be soon explained, it is possible to execute desired ones of the AND and OR operations in a desired sequence without requiring operation-identifying characters (operator codes) between individual names of variables or requiring sequence-designating codes for establishing the sequence in which the logical operations are to be carried out.

It should be understood that the product strings of any one equation block do not have to be listed sequentially one after the other as shown in FIG. 5 but can rather be distributed randomly (in the vertical direction) throughout the matrix 53 and linked to one another through the sharing of a common left-side variable name. However, it should be understood that ordering of one A1 row above another (top-to-bottom scanning) and the ordering of one product term B1 before (left-to-right scanning) another B2 in a row does matter. By having certain variables evaluated before others, in accordance with a predetermined sequence, it is possible to eliminate the need for evaluation of other variables positioned later in the sequence (i.e., either further down the matrix 53 or more to the right in a particular row of the matrix 53). The reason for this is that certain commands in the actions list of a first-listed variable may be activated by the evaluation of the first-listed variable ahead of other variables in accordance with a predetermined sequence and that the activation of these first-taken commands alter the state of the current rule-base tree so that evaluation of the later-listed variables can be skipped This concept of having first-established results (decisions) pre-empting reasoning through later listed questions, is referred to in the art of artificial intelligence as "opportunistic planning".

Referring to steps 421 and (405-406) of FIG. 4B, the opportunistically planned execution of the action lists attached to target variables, as shown in FIG. 4B to occur in the procedure attachment step (405-406) following step 421; can redirect the inferencing engine away from ever evaluating the A1 rows or B1 terms which follow a first-touched variable having an action list which includes a procedure attachment command (i.e., "setfact").

Referring back to FIG. 5, it should be again understood that the product strings of left-side-identified equations "A1" and "C2" (51 and 52) are shown to be vertically grouped one next to the other merely for the sake of explanation. The dimensions of the functions-matrix 53 are preferably dynamically expandable to have as many rows and columns as are necessary for expressing a user-defined product string or summation of product strings. A sum of products equation (i.e. 51) can be expanded to include more product strings simply by adding new product-strings to the bottom rows (i.e., row-m) of a partially filled functions-matrix 53 and designating such new product strings as belonging to that equation (i.e. A1) by placing the appropriate left-side variable name (A1) in the equation identifying column (col. 1). A product string within an equation can be expanded either by defining one of its terms (i.e., B5) to be equal to additional product terms or by inserting the additional product terms in dynamically added columns of a desired row within the matrix 53.

NOT relations between variables are indicated by a specially reserved suffix character at the end of variable names (i.e. *) as indicated by equation block 54 of FIG. 5. While not shown in FIG. 5 (for the sake of maintaining the simplicity of this explanation), it should now be apparent to skilled artisans that one or more product strings could be "shared" by multiple left-side-identified equations if more than one column (col. 1) is reserved for identifying which product strings are to be OR'ed into which left-side-identified equation. Also, it should become apparent that the orthogonal structure of multi-dimensional matrices having more than two dimensions can be used to imply logical functions other than the AND and OR functions described here.

Figure 6:
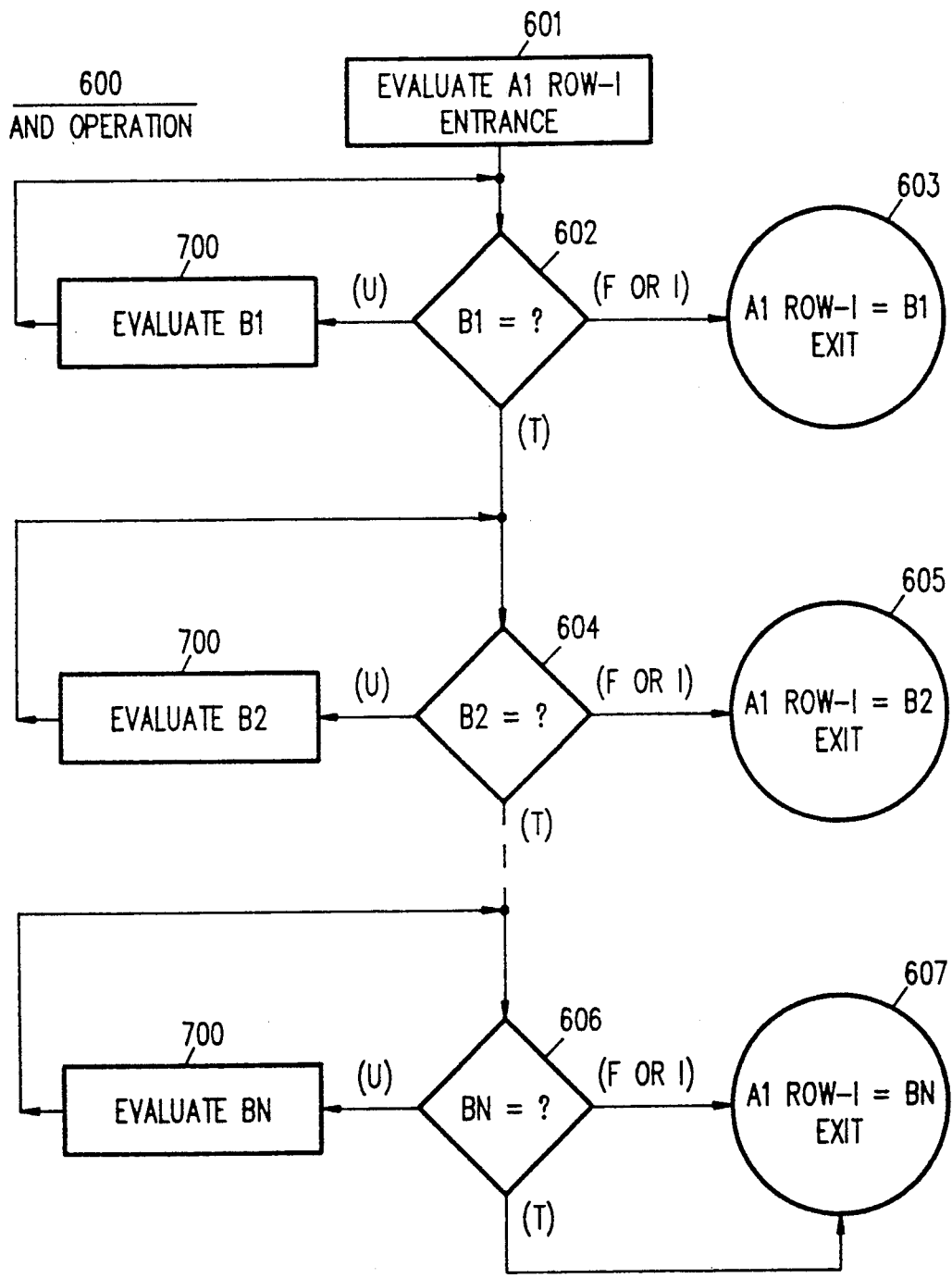
FIG. 6 is a flow chart showing how an AND operation may be performed according to the invention.

Referring to FIG. 6, it will now be explained how a product string may be evaluated according to the invention. Let it be assumed that a variable A1 is to be defined by an equation including the generic product string B1 & B2 & B3 & ... & Bn, where n is an arbitrary integer. The ECS 120 of the invention preferably employs the product-string evaluation process 600 shown in FIG. 6 to determine the value of each product string associated with a left-side (equation-identifying) variable A1 as follows. At step 601, the computer is pointing to a preselected row-i of the functions-matrix 53 whose left-most column contains the equation identifying name, A1 (the i of row-i indicates an arbitrary integer here). At step 602, the computer addresses (touches) the variable Bj listed in the next product-string-member identifying column (j being an integer pointing to, for example, col. 2) of the referenced row-i and evaluates that variable according to an evaluation method such as process 400 shown in FIG. 4A. If the first product-string item, B1, is found to have a value of either false (F) or indeterminate (I), then the process 600 immediately ends at step 603 with the return of the value A1 = B1 since any false or indeterminate item in a product string will force the entire product string to be correspondingly false or indeterminate. If the value of the first tested item, B1, is found to be true (T), the computer proceeds to the next item in the row, B2, and performs the same operation (i.e., 604) until eventually it reaches the end of the row and, if it has found the last addressed row item, Bn, to be also true (step 606), the computer can conclude that the entire product term B1–Bn is true since each of the items therein was true, and the computer can exit with the result A1 = (T) at step 607. If at any of the sequential test steps, 602, 604, ... 606, the computer returns an untested value (U), the computer then recursively attempts to evaluate the rows of the untested variable name, B1, B2, ... Bn in accordance with an OR-operation 700 that will be shortly described. Each of the variables B1, B2, Bn can in turn be a left-side equation identifier representing a sum of terms equation (i.e., Bn = C1 !C2 !C3 ... !Cn). At some point down the evaluating chain (process 400 is executed within 602, 604, ..., 606), the computer should hit an action which establishes the value of a root variable. In the this way, the computer is able to recursively chain downwardly through the tree to evaluate all AND connected variables emanating from a first branch tip (i.e., 201a).

Figure 7:
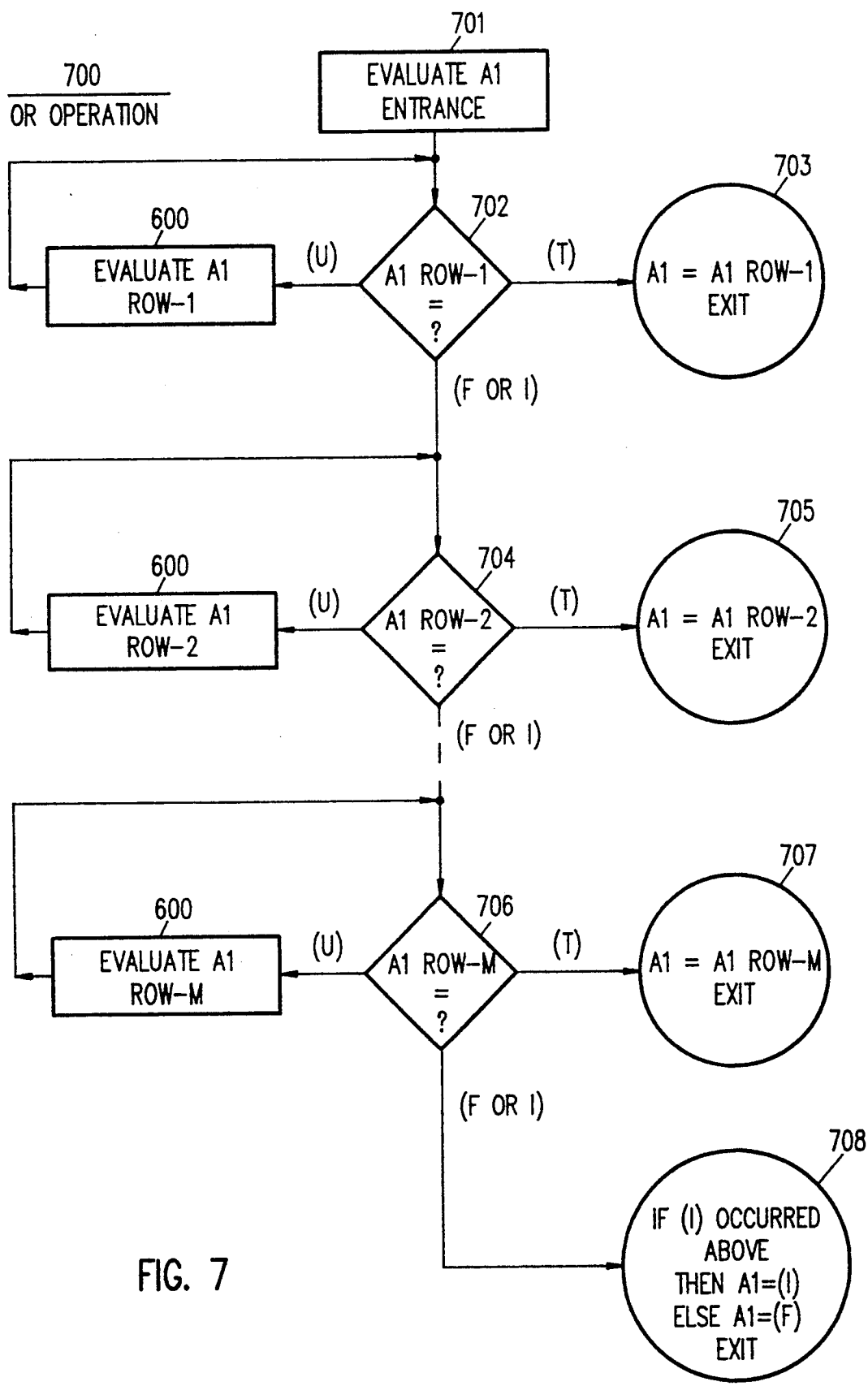
FIG. 7 is a flow chart showing how an OR operation may be performed according to the invention.

In FIG. 6 it was explained how a single row of the functions-matrix 53 is evaluated. Referring to FIG. 7, it can be now seen how the values of all rows sharing a common variable name in their equation-identifying column (i.e., col. 1) are combined to produce an OR operation. At step 701, the computer scans down the equation-identifying column (col. 1) of the matrix 53 searching for variable names matching the referenced (touched) variable name, i.e. A1. At step 702, the computer evaluates the value of the first found row which has the sought after variable name in its left-most column. If the row has only a single item in it, the value of that single item is evaluated using process 400 and returned. If the row has more than one item in it, then the row evaluation process 600 of FIG. 6 is employed to obtain the value of the row's product string. If step 702 returns a true value (T) for the scanned row, A1-row-1, then the procedure 700 is immediately exited at step 703 with the returned value of A1 = A1-row-1 since any true item in an OR string automatically forces the entire OR string (sum of terms) to be true (T). If step 702 results in either a false (F) or indeterminate (I) value being returned, then the computer searches for the next row, A1-row-i, (i being an integer, 2, 3, etc.) having the variable name A1 in its equation-identifying column and repeats the process beginning at step 704. If at step 706, when all the A1 rows (A1-row-1 through A1-row-m) have been exhausted and a value of either false (F) or indeterminate (I) is returned, then the computer proceeds to step 708 and returns a final value of A1 = (I) if an indeterminate value had been returned anywhere above at the previous A1-row-i steps (i.e. steps 702 and 704), otherwise the computer returns a value of A1 = (F). In this manner, the computer is able step across a horizontal level in a rule base tree, from left to right, to evaluate all OR connected terms of a postulated variable and all AND connected terms.

Previously, it was stated that any action list 205 can include a command to set the value of any variable name in the tree 201 to any arbitrary value (T, F, U, I) as desired If such a change-of-value action occurs, it can have repercussions on the values of other variables higher up on the rule base tree. In accordance with the invention, the computer is programmed to include a "cleareffects" command by which a user can cause the computer to chain upwardly through the tree (such as indicated at step 431 of FIG. 4B) to automatically reset variables located in tree nodes above a named variable (i.e., to the untested level) so that they each have a correct value corresponding to the value of the action-changed variable lower down.

The functions-matrix 53 of the invention is advantageously structured to expedite the execution of such an upward chaining (back-chaining) operation as well. Referring to FIG. 5, let it be assumed that a particular command has been executed in the action list of an arbitrary variable and that this command has caused the variable C2 to be changed from a previous value of true (T) to the value untested (U). The computer 120 can advantageously use the same matrix 53 for upward chaining as well as downward chaining to locate all variables whose states may be affected by the change of C2. [When C2 is so changed its equation 52 is "broken" and no longer holds true.]

In the upward chaining operation, the computer searches through the right-side-of-the-equation columns rather than through the left-side-of-the-equation identifying column(s) looking for the occurrence of the variable name whose value has been changed. In the illustrated example, the computer will discover the variable name C2 is contained at row 2, column 3, corresponding to the equation identifying left-side term A1. Since the value of A1 becomes questionable when C2 becomes (U), the computer is instructed to automatically change A1 to untested and then search through the right-side-columns of the matrix looking for rows whose value may have been changed as a result of the change in the value of A1. The process (800 as shown in FIG. 8) continues recursively until all affected nodes are switched to (U).

If desired, the computer can be programmed to scan through the row of each changed variable, i.e. C2, to determine whether any effect may have resulted on the value of that row before changing its higher located nodes, i.e., A1, to untested (U). If the value of the item C1 in column 2, row-2 of matrix 53 is false (F), for example, then the switching of C2 from true (T) to false (F) or untested (U) will have had no effect on that A1 row (row-2) and the upward chaining can terminate there. On the other hand, if the value of the next item C1 was true (T), then the switching of C2 from true to false (T to F) can effect the value of that row and have repercussions higher up. If it is determined that the value of the effected row has been changed from true (T) to some other value (F, U, I) then a determination has to be made by scanning upwardly of that row whether the changed value of that row affects the overall value of the left-side variable A1. If all A1 rows above the altered row (2) are found to have a value of false (F), then the change of the affected row from true to false should automatically cause the value of variable A1 to be changed from true to untested (U).

If downward (forward) chaining is desired (to effect the soon-to-be-described "clearcauses" command), the computer is instructed to scan down the functions-matrix 53 and to reset the values of all variables listed in the right-side columns of a row having the named variable in its left-side identifying column to the untested value (U). The process is repeated for the newly reset variable names until there are no further variable names in the matrix 53 which can act as predicate variables for the named variable whose causes are to be cleared by the "clearcauses" command.

Referring back to the actions lists 205 of FIG. 2 (or "commands list" as they are referred to in the program listing of Appendix A), a more detailed explanation of the action triggering mechanisms of the invention will now be provided. An action list may be "attached" to a variable having the name, A, using the following language construct:

A:
Action-1,
Action-2,
Action-3,
...,
Action-N.

Similarly, another action list (different or the same) may be attached to a variable having the name, B, using the language construct:

B:
Action-11,
Action-12,
...,
Action-1N,
etc.

All action list items, i.e. Action-1, Action-2, etc., preferably use the following format:

(Condition Triggering Permission) [Timing Triggering Permission] COMMAND ARGUMENTS The first parameter, (Condition Triggering Permission), can take the form: (TFUIX) where states within the parenthesis are read to be connected by the OR operation (i.e. if value of attached variable is true or false or . . . , then permission is granted at least with respect to value, but not necessarily with respect to timing, to perform the following action or actions).

Letters are used to indicate the following condition triggering directives:

U Grant Trigger permission if the attached variable is UNTESTED.

T Grant Trigger permission if the attached variable is TRUE.

F Grant Trigger permission if the attached variable is FALSE.

I Grant Trigger permission if the attached variable is UNKNOWN.

X Grant Trigger permission regardless of the attached variable state.

The (X) directive overrides all others. The (TFUIX) letters may be combined in any configuration to allow triggering of different commands with various logic states. A null (empty) condition triggering Permission ( ) defaults to (X). With respect to the computer listing of the appendix A, it should be noted that the program listing uses a slightly different nomenclature. The logical value which has been referred to above as "untested" is represented in the program by a question-mark character ("?"). The value which has been referred to above as "indeterminate" is referred to in the computer listing as "unknown" and is represented in the computer listing by the letter "U" (not to be confused with the use in this specification of the letter U to represent untested).

The second parameter, [Timing Triggering Permission], of an action list item takes the form: |M|K|L|G|F| and functions as an AND type permission term which is attached to the condition triggering permission parameter (TFUIX).

Letters are used to enable triggering either only at a specified time during the inferencing process or to enable triggering at any time:

M: the attached command can only be granted trigger permission when the Mobius program (ECS software) starts up (i.e., permission is granted only when the power-up knowledge base of the KB-stack 212 is being executed).

K: attached command can only be granted trigger permission when the current Knowledge Base starts up.

L: the attached command can only be granted trigger permission when the Hypothesis list (inferencing loop) is started up (i.e., only when the first primary goal listed in the hypothesis list is first pushed onto the goal stack 211).

G: the attached command can only be granted trigger permission when each primary goal of the Hypo list is pushed onto the goal-stack (evaluated) for a first time.

F: the attached command can be granted permission to trigger anytime during the inference cycle.

A null empty timing permission [ ] defaults to [F]

Either or both of the delimiter brackets, ( ) [ ], of the condition triggering permission and the timing triggering permission can contain more than one permission granting letter enclosed therein. The effect of having more than one permission granting symbol within the brackets is that the computer performs an OR operation and grants permission to execute the attached command if anyone of the letters in the permission string would by itself allow the computer to obtain both triggering condition and timing permission.

COMMAND ARGUMENTS

The third and fourth (if any) parameters of an action list item can take on one of the following forms Knowledge Base Commands runkb 'KB-name': This command immediately interrupts the current inferencing loop and causes the computer to place the named knowledge base (KB-name) on the KB-stack and to begin executing knowledge base KB-name as a subroutine knowledge base (on the KB stack) No state is automatically assigned to the variable which triggered the command.

getkb 'KB-name': This command executes the named knowledge base, KB-name, as a subroutine knowledge base in the same manner as the runkb command except, the terminating state (value) of the newly executed knowledge base (KB-name) is automatically assigned to the variable whose attached action list triggered the command when the newly executed KB quits.

quitkb: This command immediately terminates execution of the current knowledge base and pops it off the KB stack. The next lower KB will then begin executing where it last left off.

restartkb: This command immediately terminates the current inferencing loop of the knowledge base at the top of the KB stack, resets all the variables of that knowledge base to untested (U) and restarts execution of that knowledge base (from the top of the hypothesis list) under such reset conditions. When a knowledge base is restarted, time triggering test K will be satisfied and the hypothesis list will be evaluated beginning at the top of the list.

rerunkb: This command is similar to the restartkb command except that all the variables in the current knowledge base are not reset to the untested value, but rather retain their current values.

Goal Commands rungoal (variable): This command immediately assigns the specified variable as an alternate primary goal and executes the portions of the inference tree necessary for evaluating the alternate primary goal. No state is automatically assigned to the variable which triggered the command. If the variable which triggered the command happens to be a part of the rule tree associated with the requested alternate-primary goal, it may change state. When evaluation of the alternate primary goal is completed, the inferencing loop is resumed from where it was left off in the calling action list.

getgoal (variable): This command immediately assigns the specified variable as the alternate primary goal and executes the resulting inference tree in the same manner as rungoal except the state of the specified alternate goal is automatically assigned to the variable whose attached action list triggered the getgoal command.

quitgoal: This command immediately terminates execution of the currently executing goal (or hypothesis). The next primary goal on the goal stack, or if none, on the hypothesis list will be evaluated. If there are no further goals in the hypothesis list, the system will restart the inferencing loop by resetting all the variables to untested (U) and will begin evaluating the first primary goal listed in the hypothesis list of the current knowledge list.

restartgoal: This command immediately restarts execution of the currently executing goal.

addgoal (variable): This command adds the specified variable to the end of the current goal list (hypo-list).

delgoal (variable): This command deletes the specified variable from the goal list (hypo-list).

Fact Commands setfact (state)(variable): This command interrupts the current inferencing loop and sets a specified variable to a specified state (value) if any such state is named The specified variable may be set to UNTESTED, TRUE, FALSE, INDETERMINATE, or X. Assigning the variable to X will set the specified variable to the same state as that of the variable whose action list triggered the setfact command. After the state of the specified variable is set, the action list (command list) attached to the specified target variable is immediately executed; followed by an automatic mutually exclusive scanning operation and NOT scanning operation to change the values of MES and NOT connected variables linked to the target variable. Once this is completed, the interrupted inferencing loop (the action list of the triggering variable) is resumed to continue with other commands which may be listed below the setfact command.

getfact (variable): This command sets the touched variable whose action list is being executed to the state of the specified variable.

quitfact: This command terminates execution of further commands in the action list attached to the touched variable.

restartfact: This command restarts execution at the top of the action list attached to the touched variable (touched fact).

cleareffects (variable): This command resets all the effects (uptree nodes) above the specified variable to the UNTESTED state.

clearcauses (variable): This command resets all the causes (downtree nodes) below the named variable to the UNTESTED state.

getlaststate (variable): This command sets the value of the touched variable whose action list triggered the getlaststate command to whatever state the specified variable had during the last inferencing loop (i.e. the last pass through the Hypo-list).

Global Commands

A common area of memory is set aside for access by any knowledge base. Cells within this common area are defined as global variables and they are named simply by using global variable numbers rather than specific names. By way of example, common memory can be set aside for global variable numbers 1-256. Each of these global variables may be accessed by the global commands listed below.

setglobal (globalvariablenostate): This command sets a specified global variable (as named by a global variable number) to a specified state if such a state is specified or to the state of the touched variable whose action list triggered this command if a state is not specified. The global variable may be set to UNTESTED, TRUE, FALSE, UNKNOWN, or X. Assigning the variable to X will set the global variable to the state of the touched variable whose action list triggered the setglobal command.

getglobal (globalvariableno.): This command sets the touched variable whose command is being triggered to the state of the specified global variable (as identified by a global variable number).

Operator Communication Commands

The invention provides a communication port through which messages can be sent to and received from a supervising (human) operator. The operator port is identified by an operator port number.

send <port> "message/Od": This command sends a text string "message" to a named serial communication <port>.

ask <port> "message/Od": This command issues a send command with text string "message" to a named serial communication <port> and then waits to read an input signal from the named <port>. The input value can be T, F or untested; and the touched variable is set to the input value.

confirm <port> "message/Od": This is one same as the ask command except that the touched variable is always set to TRUE once the input value is read (any response, regardless of its value, sets the touched node to True).

sendvartext <port>: This command can only be attached to a variable having a name which ends with the character string ":message". When this command is triggered, the "message" suffix which follows the first colon in the triggered variable name is sent to the specified port.

askvartext <port>: This command issues a sendvartext command and waits for an input value from the specified port. The value of input can be T, F or untested; and the touched variable is set to the input value.

read <port>: This command waits for an input value from the specified port. The value can be T, F or untested and the touched variable is set to the input value.

PLC Communication Commands

In accordance with the invention, the boolean levels at "contact points" within specified PLC cards can be used to establish the true or false (T or F) value of prespecified root nodes in a command tree. The designation of contact points varies from one PLC manufacturer to another. These designations usually have the five digit form "abcde" where a first digit indicates whether a contact point is an input or an output, a second digit indicates a rack number, a third digit indicates a group number, a fourth digit indicates a slot number and a fifth digit indicates some further identification of the contact point. In the below-listed PLC Communication commands, the terms y1 and y2 will be used to indicate such contact point designation numbers fetchblock <port> (y1 y2 n m): First parameter y1 designates a first contact point in a fetch group and the second parameter y2 indicates the last contact point of the fetch group. An input-block variable array is preferably used as an intermediate buffer for passing large blocks of data to multiple root nodes of a knowledge base tree. If a checksum error occurs during transmission of the desired information from the designated PLC, or the PLC fails to immediately respond, the request is automatically repeated for no longer than a predetermined time span and for no more than a predetermined number of retries. The third parameter indicates that if n seconds pass and a successful fetch is still not realized, an error message is to be sent to the operator console. (Different error messages are sent depending on whether the failure is due to a checksum error or to some other error.) The fourth parameter indicates that the fetchblock request may be repeated to the PLC for no more than m times. If transmission is not successful, appropriate error messages are sent to the operator console. If a fetchblock operation is not successfully completed within the specified time limit or specified number of retries limit, all the destination cells in the input block array are set to the unknown value (U).

readplc {y1}: This command sets the value of the touched variable whose action list triggered the read PLC command to the boolean value of the single PLC contact point represented by the designation y1. Preferably, the read information comes from a buffering input-block whose cells are periodically refreshed by a fetchblock command rather than directly from a contact point on a PLC.

sendplc {y1}: This command transmits the value of the touched variable whose action list triggered the sendplc command directly to the single PLC contact point represented by the designation y1. An intermediate buffer is preferably not used so that the response of the ECS to be external conditions is as immediate as possible once a decision (conclusion) is reached.

The above-listed commands may be realized using the C language computer program which is listed in microfiche appendix A.

As can be seen from the above, the action of an inferencing engine 128 can be controlled flexibly to respond immediately to the states of PLC contact points, to a specific state of any variable within a knowledge base module, to the occurrence or failure of occurrence of a specific value at a specific time, and so forth.

Figure 10:
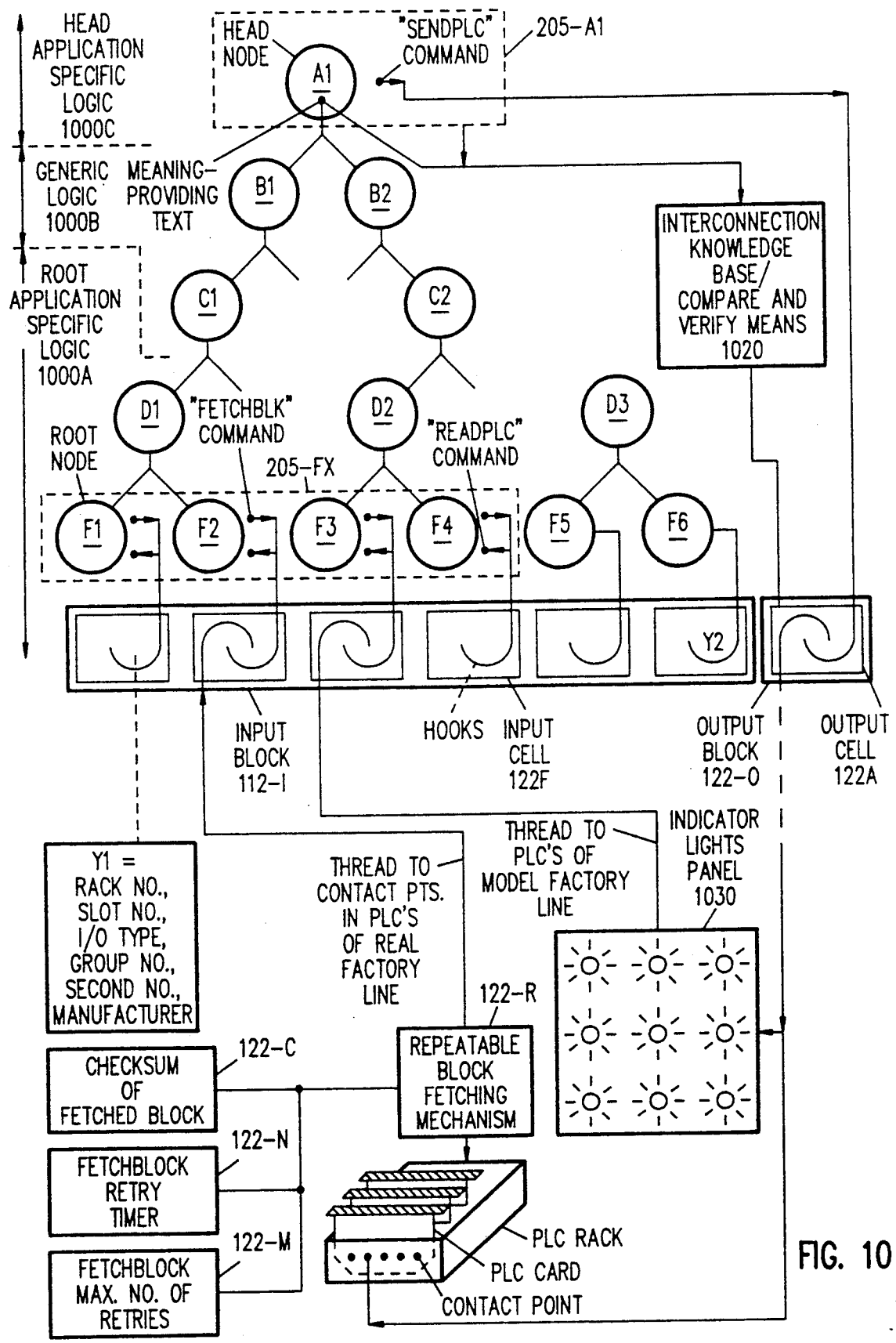
FIG. 10 is a schematic diagram showing how connections may be threaded between the root nodes of a knowledge base tree and contact points on the PLC of a specific manufacture, mounted in a specific slot of a PLC rack, and how information stored in block array cells linked to the root nodes may be used to verify proper interconnection of a root node to a desired contact point.

Referring to FIG. 10, and also the PLC communication commands listed above, it will be appreciated that the values of root nodes in a rule base tree should be switched from an untested condition (U) to a factual condition after the corresponding contact points of a PLC are read. If conditions are deemed to have changed on the factory floor so that the last reading of the PLC contact points is questionable, the root nodes should be cleared to the untested value and their current values should be updated using the fetchblock command and the readplc command.

In FIG. 10, variable nodes F1 through F6 represent the root nodes of a tree having the variable A1 as its head node. Whenever a "fetchblk" command is executed, a block of information is transmitted to an input block array 122*i* of the communications management module 122. The communications management module 122 includes a repeatable blockfetching mechanism 122*r* for repeatedly requesting blocks of information from designated PLC contact points if a first fetch request fails. Failure can be indicated by a checksum verifying means 122*c* of the communications management module 122 or by failure to receive any information from the contact points of one or more PLC cards located in a PLC rack. The communications management module 122 includes a time-out means 122*n* for limiting the number of automatic retry attempts by fetching mechanism 122*r* to a specified number n of seconds as previously described with respect to the fetchblk command. The communications management module 122 further includes a number of retries limiting means 122*m* for limiting the number of retries which the fetching mechanism 122*r* will attempt in accordance with the retries limiting number m previously described with respect to the "fetchblk" command.

The input block array 122*i* functions as a buffer between the root nodes F1-F6 of a knowledge base and external contact points of one or more PLC's. The boolean value in an individual input cell 122*f* of the input block 122*i* is not transferred to a root node Fx until a "readplc" command is executed in, for example, an action list 205-Fx attached to a specific root node Fx. Such a structuring of data transfer, so that information is sent to a root node Fx only when needed, eliminates time which would be consumed in transferring unneeded information and thereby minimizes the inferencing speed of the ECS 120. It will be appreciated by those skilled in the art, that although a small number of root nodes Fx are illustrated in FIG. 10, it is common practice to have a much larger number of such root nodes, the much larger number typically being in the range of at least 100 or more.

With such a larger number of connections being made between the root nodes F1-F6 and contact points on multiple PLC cards located in various slots of a PLC rack, there is the danger that a wrong connection may be made between a particular input cell 122f of the block variable array 122i. For instance, a particular cell of the block variable array 122i may be intended for use as an input point while the PLC contact point to which it is connected by way of wire is also designated as a data input point rather than, desirably, as a data output point. In such a case, neither the ECS 120 or the PLC will receive correct signal levels since their input points are connected to one another rather than to complementary output points.

In accordance with one aspect of the invention, contact point designation information y1, y2, etc. is stored in each corresponding cell 122f or 122a of input block variable array 122i and an output array 122o for indicating which specific PLC contact point that cell 122f or 122a is intended to be connected to. This constitutes one of the "links" 208 previously mentioned. An interconnection knowledge base and verifying means 1020 is included in the ECS for cross checking between the variable name of each root or head node F1-F6 or A1-Ax and the contact point designation information y1 stored in the corresponding cell 122f or 122a of the block variable arrays 122i and 122o to assure that the variable name (meaning-providing text) of the node corresponds to the input/output nature of the contact point designated by the information y1 in the cell, 122f or 122a, and/or to other characteristics of the contact point designation number abcde which an expert having knowledge of the specific manufacturer would wish to test against the meaning-providing name of the variable node to which the cell is connected by way of either a "readplc" or a "sendplc" command. A separate development knowledge base 130 (FIG. 9) is preferably used during development for controlling the interconnection verify means 1020. By way of example, if a root node variable name Fx includes text indicating that it should be an input point while the contact designation information in the corresponding block variable array cell 122fx indicates that connection will be made to not an output point of a PLC card but rather an input point, the interconnection knowledge base and verifying means 1020 will send a warning message to the operator/developer indicating the possibility of an error.

In accordance with another aspect of the invention, an indicator light panel 1030 may be coupled to the end connectors of the block variable arrays 122i and 122o to visually indicate which PLC contact point is being accessed whenever a "fetchblock" or "sendplc" command is executed. This gives developers an easy indication that correct contact points are being accessed by the inferencing engine at appropriate times.

Referring to the overall structure of FIG. 10, it can be seen that application-specific input signals enter the root nodes Fx of a knowledge base tree, percolate from a application-specific root logic portion 1000a of a tree to a generic reasoning portion 1000b; and from there rise further up to an application-specific head portion 1000c which outputs a decision command ("sendplc") directly to a contact point on a PLC by way of an output cell 122a in an output array 122o. Since only the application-specific root and head portions, 1000a and 1000c, of the trees interface intermediate generic logic portion 1000b should be developed independently of the application-specific portions 1000a and 1000c for use in other application-specific environments. An application-specific interconnection verifying means 1020 is used for checking the variable names of head and root nodes (which are coupled to PLC contact points) to assure proper threading of signals.

Figure 9:
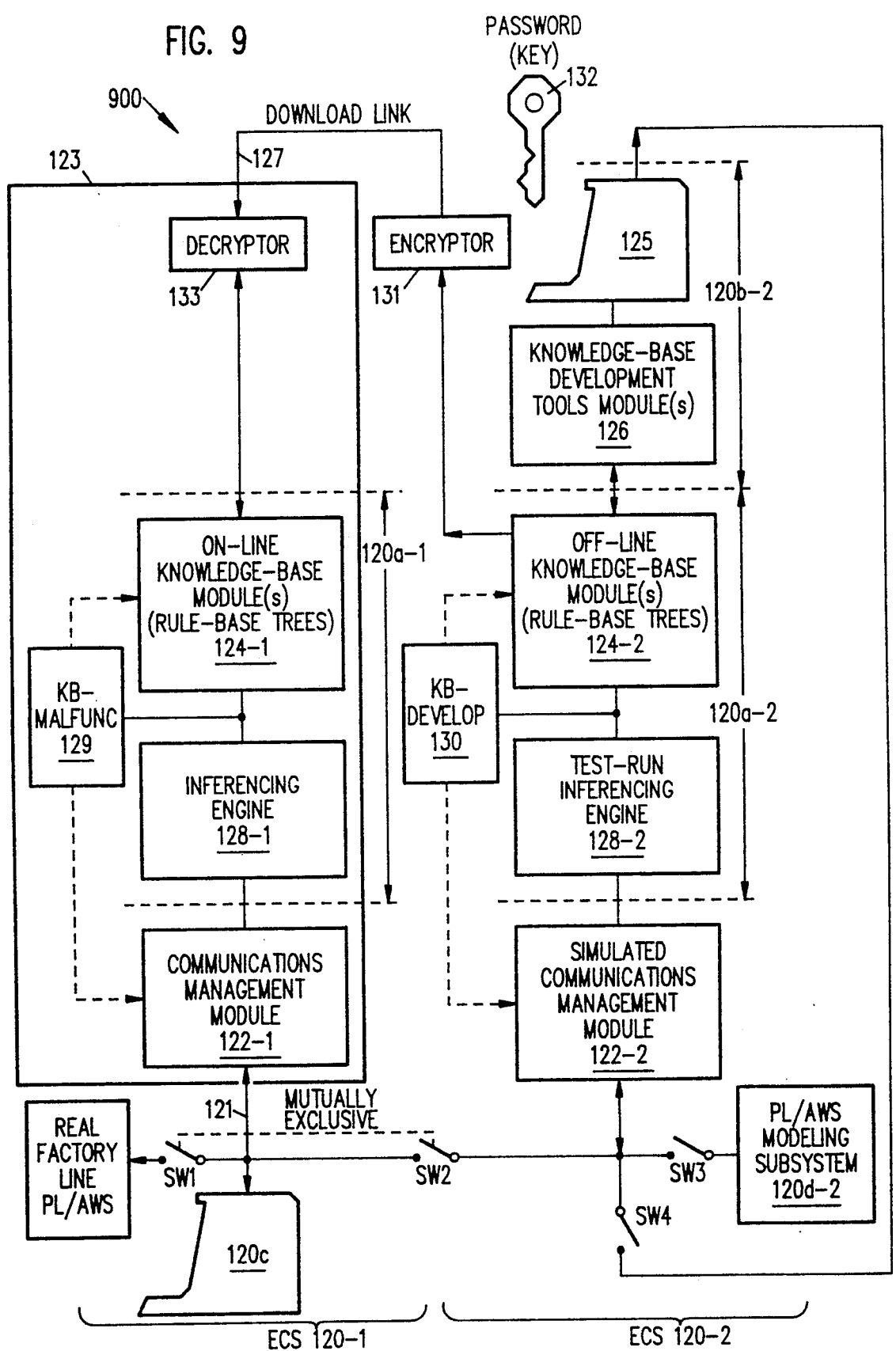
FIG. 9 is a schematic diagram of an expert control system development/use arrangement in accordance with the invention.

Referring now to FIG. 9, a typical development environment 900 will be described. The root nodes of an on-line knowledge base module 124-1 are coupled to the external world through a communications management module 122-1. Verification of correct interconnection between the root nodes of the on-line knowledge base 124-1 and the external world is verified by a malfunction detecting knowledge base 129 (such as the application-specific interconnection knowledge base and verification means 1020 described in FIG. 10). The on-line ECS 120-1 in which the on-line KB 124-1 is included may be selectively coupled, by closing switch Sw1, to the real factory line PL/AWS, or the on-line ECS 120-1 may be coupled to a PL/AWS modeling system 120d-2 by instead closing switches Sw2 and Sw3, or further it may be connected to receive manual input from operator terminal 125 by closing switches Sw2 and Sw4. Switches Sw1 and Sw2 are preferably closed in a mutually exclusive manner in order to assure that the off-line system ECS 120-2 cannot be coupled to the real factory line PL/AWS.

In the preferred embodiment, the on-line ECS 120-1 is implemented within a securely enclosed (123) microcomputer having an Intel 8286 CPU running at 12 MHz and supported with 512 K byte DRAM and 232 K byte EPROM. The 512 K DRAM functions as a cache memory for a 30 MB hard disk. Information representing the knowledge bases of the system are stored on the hard disk and downloaded into the cache memory as needed. Program information defining the inferencing engine is preferably stored in the nonvolatile EPROM which preferably further stores the malfunction detecting knowledge base 129, so that even if the hard disk fails, the on-line ECS 120-1 can intelligently take appropriate action to avoid damage to the real factory line PL/AWS. In accordance with one embodiment of the invention, the microcomputer, including DRAM and EPROM is implemented using an Ampro circuit board model number 7A12-3 with a model number 3EN2C enclosure and power supply. The 30MB hard disk drive is a Seagate model number HD 138 N-1. Intel 27256 chips are used for the EPROM memory. The microcomputer is preferably provided with one or more RS-232 serial communication ports each capable of serially transmitting data at a rate of at least 19,200 baud (bits per second) and more preferably at a rate of at least 38,000 baud. It has been found, that by using the functions-matrix structure 53 shown in FIG. 5, an inferencing engine according to the invention can usually keep pace with input information that is fetched from a block of PLC's transmitting at 19,200 baud.

Included in the EPROM memory is the necessary control software for loading new information into the on-line ECS 120-1 and including an information download decryptor 133 which prevents such information from being downloaded unless an appropriate encryption key 132 is possessed by the downloading party.

As seen in the right side of FIG. 9, a new knowledge base module 124-2, which is developed off-line, may be downloaded into the on-line ECS 120-1 by passing its information through a development system encryptor 131, activated by an appropriate password (key) 132 and from there through a securely enclosed decryptor 133 into the memory means used for storing the on-line knowledge base module or modules 124-1. Preferably, connection switches Sw1 and Sw2 are mutually exclusive so that an off-line, under-development expert control system ECS 120-2 cannot be connected directly to the real factory line PL/AWS. A new knowledge base under development, 124-2, is first tested against a model of the factory line 122d-2 before ever being allowed to be run against the real factory line PL/AWS.

Appropriate knowledge-base-development rule-trees 130 may be included within the environment of the off-line development ECS 120-2 to aid developers in the formation of their off-line factory controlling knowledge base modules 124-2. The knowledge-base-development rule-trees 130 can include rules for flagging out circular reasoning and other such undesirable constructs within the off-line knowledge base modules 124-2.

Numerous modifications and variations to the disclosed invention will become apparent to those skilled in the art once the principles and spirit of the invention are appreciated. The preferred embodiments described above are not intended to be taken in a limiting sense. The scope of the claimed invention should be liberally construed in accordance with the language of the following claims rather than in accordance with any specific embodiment described above.

We claim:

1. An expert control computer system comprising:

knowledge base means for defining at least one rule base tree, said rule base tree including a plurality of logically connected variables which can each take on at least the four mutually exclusive values true (T), false (F), untested (U) and indeterminant (I); and inferencing engine means for evaluating the value of one variable in the rule base tree in response to the value of at least a second variable logically connected thereto; and value altering means for altering the value of a uniquely selected variable within said rule base tree from any one value of said four values to any other value of said four values, wherein the values of higher-placed ones of the logically connected variables in the at least one rule base tree are at least once inferenced from the values of other lower-placed variable, the system further comprising up-chaining means for automatically up-chaining through the at least one tree when the value of a lower-placed variable is altered and for automatically changing the values of the higher-placed variables whose values have been inferenced from the altered lower-placed variable.

* * * * *

UNITED STATES PATENT AND TRADEMARK OFFICE
CERTIFICATE OF CORRECTION

PATENT NO.   : 5,119,318

DATED        : June 2, 1992

INVENTOR(S)  : David Paradies, Edison Tse

It is certified that error appears in the above-identified patent and that said Letters Patent is hereby corrected as shown below:

On the title page, Item [75]:
Delete "Gary M. Leo" as a listed inventor.

Signed and Sealed this

Twenty-fifth Day of January, 1994

Attest:

BRUCE LEHMAN

Attesting Officer

Commissioner of Patents and Trademarks